(12) United States Patent
Baker et al.

(10) Patent No.: US 11,062,618 B2
(45) Date of Patent: Jul. 13, 2021

(54) SELF-TRAINING MACHINE-LEARNING SYSTEM FOR GENERATING AND PROVIDING ACTION RECOMMENDATIONS

(71) Applicant: UnitedHealth Group Incorporated, Minnetonka, MN (US)

(72) Inventors: Michael Baker, Minnetonka, MN (US); Andrew Delany, Atlanta, GA (US); Siddhartha Bothra, Minneapolis, MN (US); Shikha Desai, Minneapolis, MN (US); Marie Guthrie, Roanoke, VA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 69 days.

(21) Appl. No.: 16/446,725

(22) Filed: Jun. 20, 2019

(65) Prior Publication Data

US 2020/0005667 A1 Jan. 2, 2020

Related U.S. Application Data

(60) Provisional application No. 62/691,270, filed on Jun. 28, 2018.

(51) Int. Cl.
*G06F 3/0483* (2013.01)
*G09B 19/00* (2006.01)
(Continued)

(52) U.S. Cl.
CPC ......... *G09B 19/00* (2013.01); *G06F 3/0482* (2013.01); *G06F 3/0483* (2013.01); *G06N 20/00* (2019.01)

(58) Field of Classification Search
None
See application file for complete search history.

(56) References Cited

U.S. PATENT DOCUMENTS 9,208,465 B2 12/2015 Grasso et al.
2007/0266133 A1* 11/2007 Bukovec ............... H04L 41/16
  709/223

(Continued)

OTHER PUBLICATIONS

"Call Center Software," Voicent, (4 pages). [Retrieved From the Internet] <https://www.voicent.com/call-center-software.php>.
"Call Center Supervisor Overview," AVAD Technologies, (4 pages). [Retrieved From the Internet] <https://avadtechnologies.com/virtual-contact-center/call-center-features/call-center-supervisor-overview/>.

(Continued)

*Primary Examiner* — Rinna Yi
(74) *Attorney, Agent, or Firm* — Alston & Bird LLP

(57) ABSTRACT

A user computing entity executes application program code to cause display of an IUI via a user interface of the user computing entity. The IUI comprises an action list comprising one or more action items corresponding to one or more team members of a team. The action items are automatically ordered based on one or more action priorities. At least one of the action items corresponds to a coaching opportunity and a recommendation for responding thereto. The coaching opportunity is automatically identified using a recommendation model trained using machine learning based at least in part on performance data corresponding to a plurality of key performance indicator metrics. The recommendation for responding to the coaching opportunity is determined using the recommendation model and based on the performance data. The recommendation model is trained using information regarding previous handlings of coaching opportunities and corresponding outcome indicators for a cluster of teams.

16 Claims, 13 Drawing Sheets

(51) Int. Cl.
*G06F 3/0482* (2013.01)
*G06N 20/00* (2019.01)

(56) References Cited

U.S. PATENT DOCUMENTS

| | | | |
|---|---|---|---|
| 2011/0307303 A1 | 12/2011 | Dutta et al. | |
| 2014/0081715 A1* | 3/2014 | Govindaraman | G06Q 50/2057 705/7.42 |
| 2014/0335497 A1* | 11/2014 | Gal | G09B 5/08 434/323 |
| 2015/0371172 A1* | 12/2015 | Minter | G06Q 10/06398 705/7.42 |
| 2018/0146091 A1 | 5/2018 | Baker et al. | |

OTHER PUBLICATIONS

"Contact Center Management," Call Center Management, (7 pages). [Retrieved From the Internet Sep. 19, 2019] <https://www.niceincontact.com/call-center-software/contact-center-management>.

"CXOne Analytics," NICE-inContact, Sep. 2017, (8 pages). [Retrieved From the Internet Sep. 19, 2019] <https://1b6acaf34923b14edfa9-0387da740696a89f79c8a705eca01c89.ssl.cf1.rackcdn.com/ANA0011_NICE_inContact_Analytics_Brochure_06.18.pdf>.

Faykus Preston. "Predictive Voice Analytics: A Supervisors Guide to Agent Trends," RankMiner, Apr. 14, 2017, (5 pages). [Retrieved From the Internet Sep. 19, 2019] <https://www.rankminer.com/post/supervisors-guide-to-agent-trends>.

\* cited by examiner

FIG. 7B

Next Best Action

PEREA BATRES — Positive Acknowledgement
Yay!! Congratulations for 100% Quality. Evaluation Id - 571874 | Evaluation Date -04/05/2019

GRANJA CORDOVA — HandWritten Notes
JOEL CORDOVA has not sent any Handwritten Notes in the first week of April

---

NEXT BEST ACTION

Related To:*
[ Select ▾ ]

Title:*
[ Select ▾ ]
- Select
- Anniversary
- Attendance Discrepancy
- Birthday
- Bravo
- Coaching Action
- HandWritten Notes
- Meeting
- Positive Acknowledgement
- Positive Trend
- Reminder
- Team Meeting Status:*
[ Select ▾ ]

Open:

[ CANCEL ]     [ SAVE ]

SELF-TRAINING MACHINE-LEARNING SYSTEM FOR GENERATING AND PROVIDING ACTION RECOMMENDATIONS

CROSS-REFERENCE TO RELATED APPLICATIONS

This application claims priority to U.S. Application No. 62/691,270, filed Jun. 28, 2018 the content of which is hereby incorporated by reference herein in its entirety.

FIELD

Various embodiments relate generally to an interactive user interface for team management that provides a team leader with prioritized action items for improving team and/or team member performance. For example, an example embodiment includes a machine learning-trained model that provides recommendations to the team leader regarding prioritized action items for improving team and/or team member performance.

BACKGROUND

In various scenarios a team may include a team leader and a plurality of team members. The team leader may be charged with coaching team members to improve the performance of the individual team members and the team as a whole. Traditionally, team leaders are tasked with identifying coaching opportunities and determining how to address such coaching opportunities. Thus, team leaders may spend a significant amount of time identifying coaching opportunities, determining how to address coaching opportunities, and addressing the coaching opportunities. This may lead to team leaders having very little time to perform other work tasks.

BRIEF SUMMARY OF SOME EXAMPLE EMBODIMENTS

Various embodiments provide methods, apparatuses, computer program products, systems, and/or the like that provide a team leader interactive user interface (IUI) configured to provide team leaders with a prioritized list of action items along with other information/data corresponding to team member and team performance. In various embodiments, the IUI provides team and/or team member metrics corresponding to key performance indicators (KPIs). In various embodiments, the metrics are determined by analyzing performance information/data. In various embodiments, the team and/or team member metrics are (near) real time metrics. For example, the performance information/data corresponding to the team and/or individual team members may be analyzed periodically (e.g., every hour, every two hours, and/or the like) and the metrics may be updated accordingly. In various embodiments, action items of the list of action items and/or a priority of the action items within the list of action items may be determined based on one or more of the metrics. In various embodiments, the relative priority of action items of the list of action items is used to determine the order in which the action items are presented in the list of action items. In an example embodiment, a recommendation as to address one or more action items is provided. For example, at least some of the action items may corresponding to coaching opportunities. In various embodiments, a coaching opportunity may correspond to a single defect in a team or team member's performance (e.g., missing a single deadline), one or more comprehensive metric values (e.g., a metric corresponding to multiple tasks/interactions being below a goal level), a trend in one or more metric values, and/or the like.

As used herein, a coaching opportunity is a situation identified where team or team member performance may be improved and/or maintained above a goal level (e.g., as measured via one or more metrics corresponding to KPIs) in response to team leader coaching. In various embodiments, team leader coaching may include any performance related communication between the team leader and one or more team members associated with the coaching opportunity. In an example embodiment, the coaching opportunity may be a positive feedback opportunity and the team leader may coach the associated team member(s) by providing positive feedback (e.g., Congratulations on making goal XYZ!, Thank you for your work on this!, etc.). In an example embodiment, the coaching opportunity may require the team leader to provide training regarding a particular procedural matter, a reminder regarding a procedural matter, a reminder of what is required to meet one or more goals, minor disciplinary action, and/or the like. In various embodiments, the coaching provided by the team leader may be based on and recorded (e.g., for various organizational records) using a coaching form. In an example embodiment, the coaching form is a form comprising information/data corresponding a coaching session. A coaching session is the interaction and/or communication through which the team leader coaches the team and/or team member(s). In an example embodiment, a coaching form comprises fields corresponding to information/data identifying the team leader, the one or more team members associated with the coaching session, one or more metrics corresponding to identifying of the coaching opportunity, feedback for provided during the coaching session (e.g., positive feedback, suggestions for improvement, procedural matter information/data, and/or the like), a date and time of the coaching session, and/or other information/data corresponding to the coaching session. In an example embodiment, a team leader may choose to forgive a coaching opportunity (e.g., choose to not address the coaching opportunity with the team and/or associated team member(s)) and/or choose to rebut a coaching opportunity (e.g., choose to argue against the coaching opportunity and/or provide additional contextual information/data corresponding to one or more metrics used to identify the coaching opportunity).

In various embodiments, the team leader IUI provides a recommendation regarding how to address a coaching opportunity. For example, the team leader IUI may provide a coaching opportunity and a recommended strategy for responding to the coaching opportunity (e.g., provide positive feedback, address, forgive, and/or rebut). In an example embodiment, the recommendation may be determined using a recommendation model trained using machine learning. In an example embodiment, a set of teams may be clustered based on overlapping KPIs used to monitor the team's performance and/or overlapping priorities. Completed coaching opportunities and an outcome indicator corresponding to the outcome of each of the coaching opportunities for teams of a cluster may be used to train a recommendation model for the corresponding cluster of teams. In various embodiments, a completed coaching opportunity is a coaching opportunity in which the team leader has provided positive feedback, addressed the coaching opportunity, chosen to forgive the coaching opportunity, and/or a rebuttal process has been completed. In an example embodiment, the outcome indicator may be determined within minutes of coaching opportunity being completed, one or more hours after the coaching opportunity has been completed, one or more days after the coaching opportunity has been completed, and/or the like. Through the training of the recommendation model based on coaching forms corresponding to completed coaching opportunities and the corresponding outcome indicators, the recommendation model learns to determine a recommendation for responding to various coaching opportunities that are most likely to lead to improving team and/or team member performance and/or maintaining of team and/or team member performance above a goal level. In various embodiments, the recommendation model may be further configured to determine recommendations regarding which metrics are most important for a team and/or team member to achieve one or more goals and/or to avoid one or more coaching opportunities from being initiated/identified. In various embodiments, the recommendation model may be further configured to pre-fill a coaching form to provide the team leader with information/data regarding the problem to be addressed (e.g., the one or more metrics and/or the like that triggered the coaching opportunity, trend(s) in one or more metrics that triggered the coaching opportunity, and/or the like) and how the problem may be addressed (e.g., suggestions for improving performance, training materials to be used, and/or the like).

In various embodiments, the team leader IUI may be configured to provide a convenient dashboard through which the team leader may efficiently monitor team and/or individual team member performance (e.g., via one or more metrics corresponding to KPIs) and determine the most efficient way for improving team and/or team member performance in accordance with the priorities of the team. In particular, various embodiments provide significant improvements over the art by not only providing a team leader with a list of action items ordered based on the priorities of the team, but by also providing a recommendation regarding how the team leader may address an action item to most effectively improve the performance of the team and/or team member(s) and/or to maintain the performance of the team and/or team member(s) above a goal level. In various embodiments, the team leader IUI may provide the team leader with graphical representations of one or more metrics corresponding to KPIs for the team and/or individual team members, graphical representations of trends in one or more metrics corresponding to KPIs for the team and/or individual team members, information/data (and/or a graphical representation thereof) regarding which metrics are most important for achieving one or more team and/or team member goals, and/or the like. Thus, various embodiments aid in improving the efficiency with which team leaders may address coaching opportunities and well as improving team leader efficacy in identifying and addressing coaching opportunities.

According to a first aspect, a method for providing one or more action recommendations via an IUI is provided. In an example embodiment, the method comprises executing, by a user computing entity, application program code to cause display of the IUI via a user interface of the user computing entity. The team leader IUI comprises an action list comprising one or more action items each corresponding to one or more team members of a team. The one or more action items are automatically ordered based on one or more action priorities. At least one of the one or more action items corresponds to a coaching opportunity and a recommendation for responding to the coaching opportunity. The coaching opportunity is automatically identified using a recommendation model trained using machine learning based at least in part on performance data corresponding to a plurality of key performance indicator metrics. The recommendation for responding to the coaching opportunity is determined (a) using the recommendation model trained using machine learning and (b) based on the performance data corresponding to the plurality of key performance indicator metrics. The recommendation model is trained using information regarding previous handlings of coaching opportunities and corresponding outcome indicators for a cluster of teams.

According to another aspect, an apparatus is provided. In an example embodiment, the apparatus comprises at least one processor, at least one communications interface, a user interface, and at least one memory including computer program code. The at least one memory and computer program code configured to, with the processor, cause the apparatus to at least cause display of the IUI via the user interface of the apparatus. The team leader IUI comprises an action list comprising one or more action items each corresponding to one or more team members of a team. The one or more action items are automatically ordered based on one or more action priorities. At least one of the one or more action items corresponds to a coaching opportunity and a recommendation for responding to the coaching opportunity. The coaching opportunity is automatically identified using a recommendation model trained using machine learning based at least in part on performance data corresponding to a plurality of key performance indicator metrics. The recommendation for responding to the coaching opportunity is determined (a) using the recommendation model trained using machine learning and (b) based on the performance data corresponding to the plurality of key performance indicator metrics. The recommendation model is trained using information regarding previous handlings of coaching opportunities and corresponding outcome indicators for a cluster of teams.

According to yet another aspect, a computer program product is provided. In an example embodiment, the computer program product comprises at least one non-transitory computer-readable storage medium having computer-executable program code portions stored therein. The computer-executable program code portions, when executed by a processor of a computing entity, are configured to cause the computing entity to at least cause display of an IUI via a user interface of the computing entity. The IUI comprises an action list comprising one or more action items each corresponding to one or more team members of a team. The one or more action items are automatically ordered based on one or more action priorities. At least one of the one or more action items corresponds to a coaching opportunity and a recommendation for responding to the coaching opportunity. The coaching opportunity is automatically identified using a recommendation model trained using machine learning based at least in part on performance data corresponding to a plurality of key performance indicator metrics. The recommendation for responding to the coaching opportunity is determined (a) using the recommendation model trained using machine learning and (b) based on the performance data corresponding to the plurality of key performance indicator metrics. The recommendation model is trained using information regarding previous handlings of coaching opportunities and corresponding outcome indicators for a cluster of teams.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
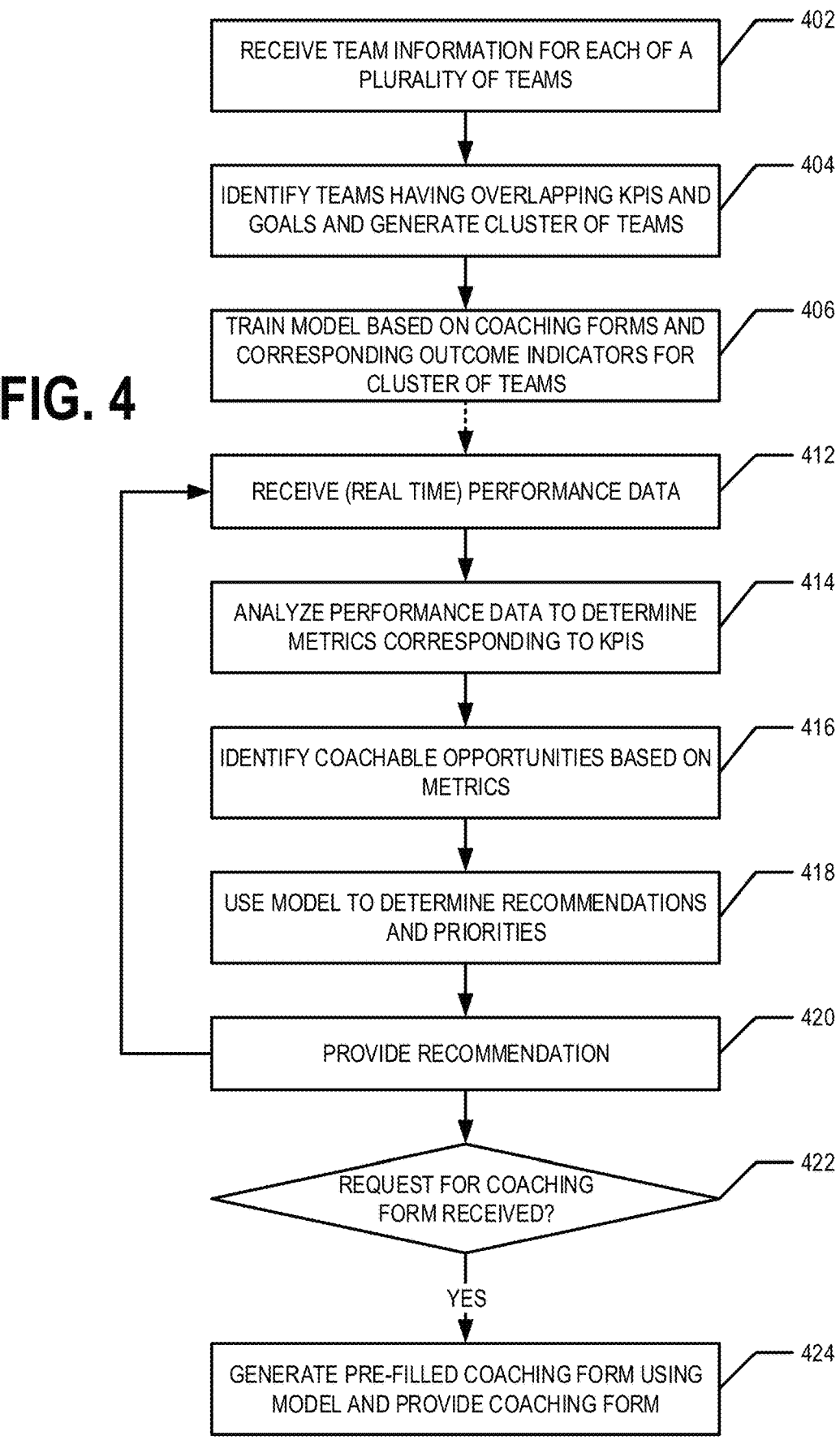
Figure 10:
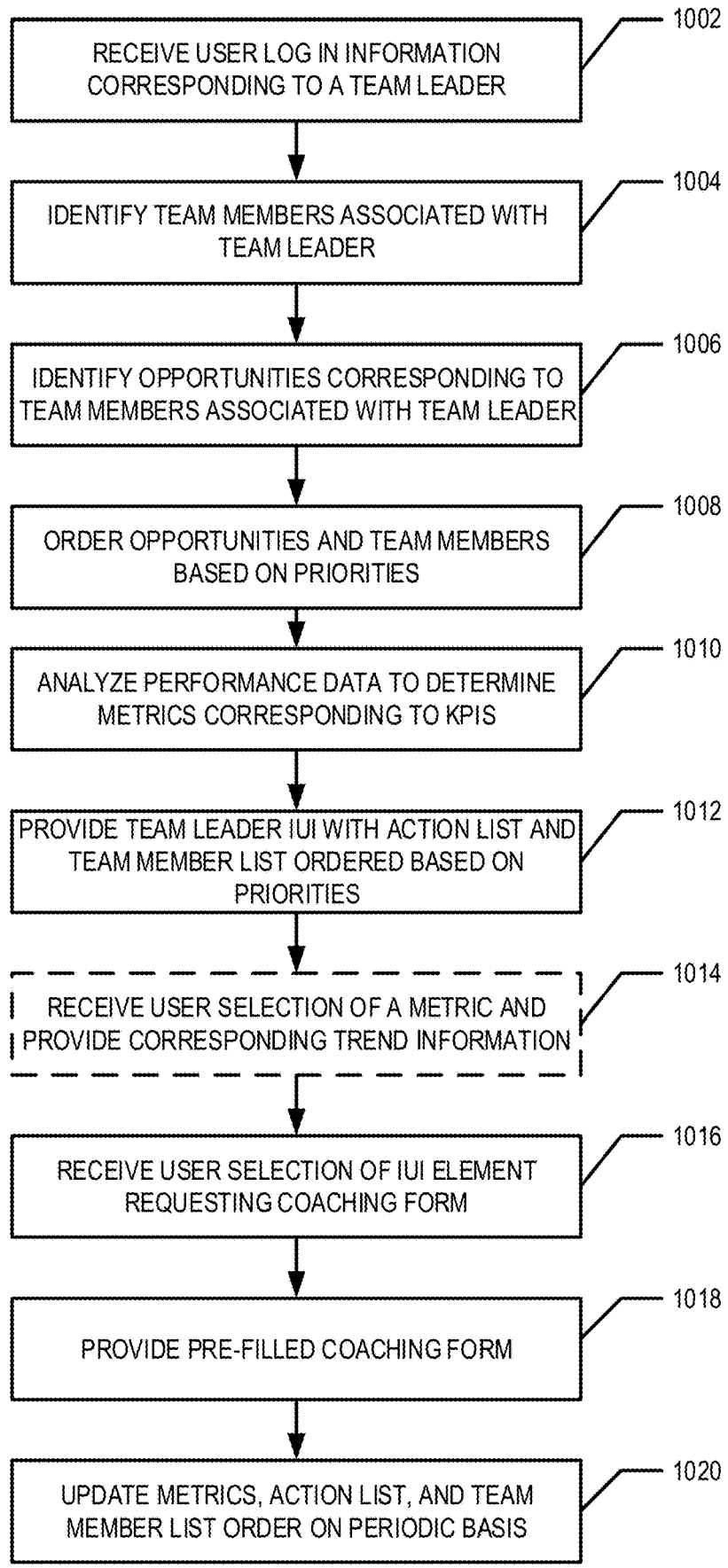
Figure 11:
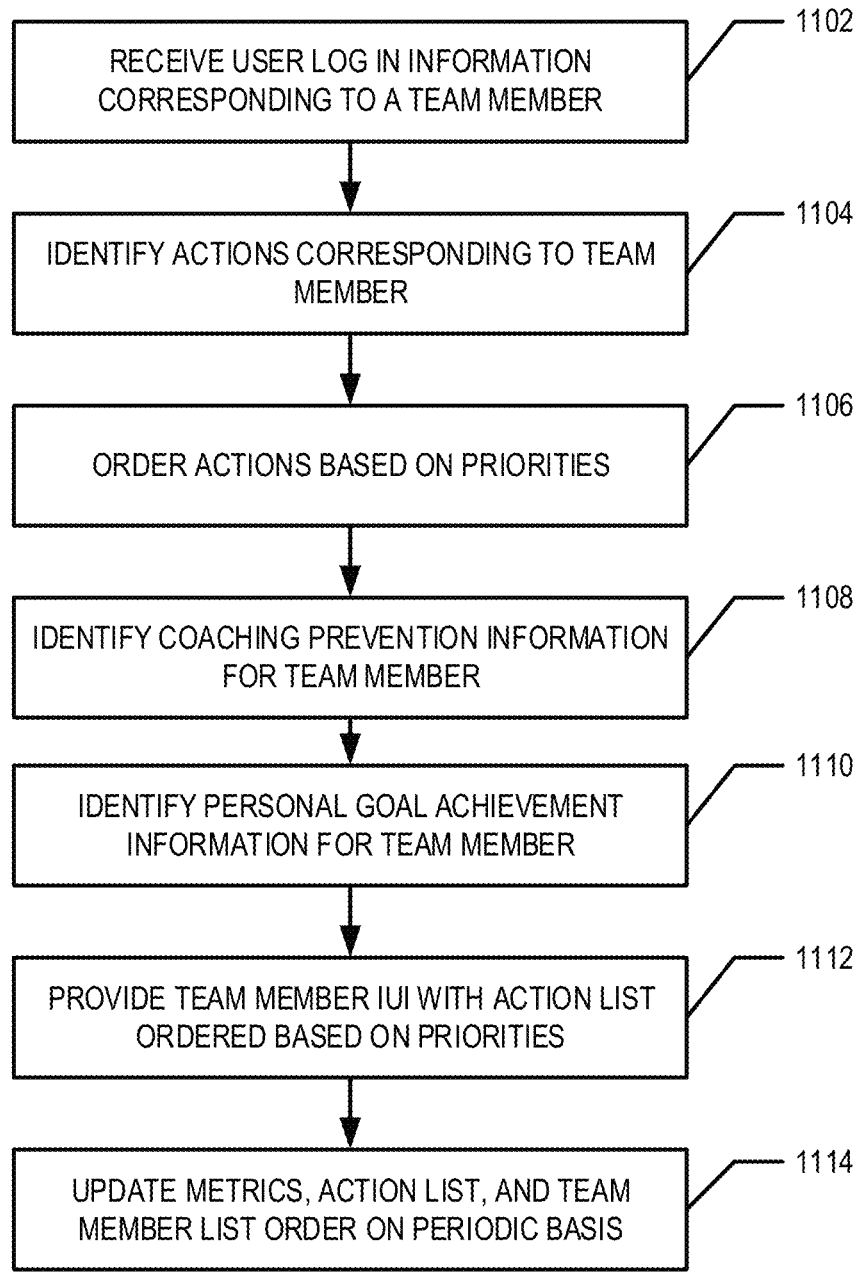

FIG. 4 provides a flowchart illustrating processes, procedures, operations, and/or the like for providing a recommendation for completing a coaching opportunity, in accordance with various embodiments of the present invention;

FIGS. 5-6, 7B-7B, and 8-9 each provide an example view of a team leader IUI, in accordance with an example embodiment of the present invention;

FIG. 10 provides a flowchart illustrating processes, procedures, operations, and/or the like for providing a team leader IUI, in accordance with various embodiments of the present invention;

FIG. 11 provides a flowchart illustrating processes, procedures, operations, and/or the like for providing a team member IUI, in accordance with various embodiments of the present invention;

FIG. 12 provides an example view of an expanded action list of a team leader IUI, in accordance with various embodiments of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

Various embodiments relate to a team leader IUI configured to provide a team leader with up-to-date (e.g., real time and/or near real time) metrics corresponding to the performance of a team associated with the team leader and/or one or more team members of the team. In various embodiments, the metrics are determined by analyzing performance information/data. In various embodiments, the performance information/data comprises information/data regarding timely completion of action items, whether one or more deadlines have been satisfied, results of client/customer surveys, and/or other information/data corresponding to the performance of one or more team members. In various embodiments, the team leader IUI provides the team leader with a priority ordered list of action items. One or more of the action items correspond to coaching opportunities for coaching the team or one or more team members. At least one of the action items corresponding to a coaching opportunity is provided with a recommendation for completing the action item. In an example embodiment, the action item and/or the corresponding coaching opportunity may be completed by a coaching activity, such as forgiving the coaching opportunity (e.g., not addressing the issue/action/ trend that resulted in the coaching opportunity being identified), providing positive feedback, providing coaching (e.g., addressing the issue/action/trend that resulted in the coaching opportunity being identified by providing the corresponding team member(s) with appropriate training, tips for improving their performance, disciplinary action, and/or the like), or rebutting the coaching opportunity (e.g., providing additional and/or contextual information/data related to the identified coaching opportunity). User input may be provided to the IUI reflecting the coaching activity performed.

In various embodiments, the recommendation for completing the action item/coaching opportunity is determined by a recommendation model operated by an analysis computing entity. For example, a recommendation model may be trained via one or more machine learning algorithms. In various embodiments, the recommendation model may be configured to identify coaching opportunities based on metrics corresponding to one or more KPIs, determine recommendations for completing coaching opportunities, generate coaching forms addressing coaching opportunities, determining a priority for completing action items, and/or the like. Thus, various embodiments provide the technical improvement of providing up-to-date (e.g., real time and/or near real time) metrics corresponding to team and/or team member performance and objective insight regarding how to most effectively and efficiently improve team and/or team member performance by considering multiple metrics and complex, hidden relationships between various metrics and the corresponding KPIs.

In various embodiments, the team leader IUI may be configured to provide a convenient graphical user interface (GUI) displaying a dashboard through which the team leader may efficiently monitor team and/or individual team member performance (e.g., via one or more metrics corresponding to KPIs) and determine the most efficient way for improving team and/or team member performance in accordance with the priorities of the team. In particular, various embodiments provide significant improvements over the art by not only providing a team leader with a list of action items ordered based on the priorities of the team, but by also providing a recommendation regarding how the team leader may address an action item to most effectively improve the performance of the team and/or team member(s) and/or to maintain the performance of the team and/or team member(s) above a goal level. In various embodiments, the team leader IUI may provide the team leader with graphical representations of one or more metrics corresponding to KPIs for the team and/or individual team members, graphical representations of trends in one or more metrics corresponding to KPIs for the team and/or individual team members, information/data (and/or a graphical representation thereof) regarding which metrics are most important for achieving one or more team and/or team member goals, and/or the like. Thus, various embodiments aid in improving the efficiency with which team leaders may address coaching opportunities and well as improving team leader efficacy in identifying and addressing coaching opportunities.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to step/operation diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
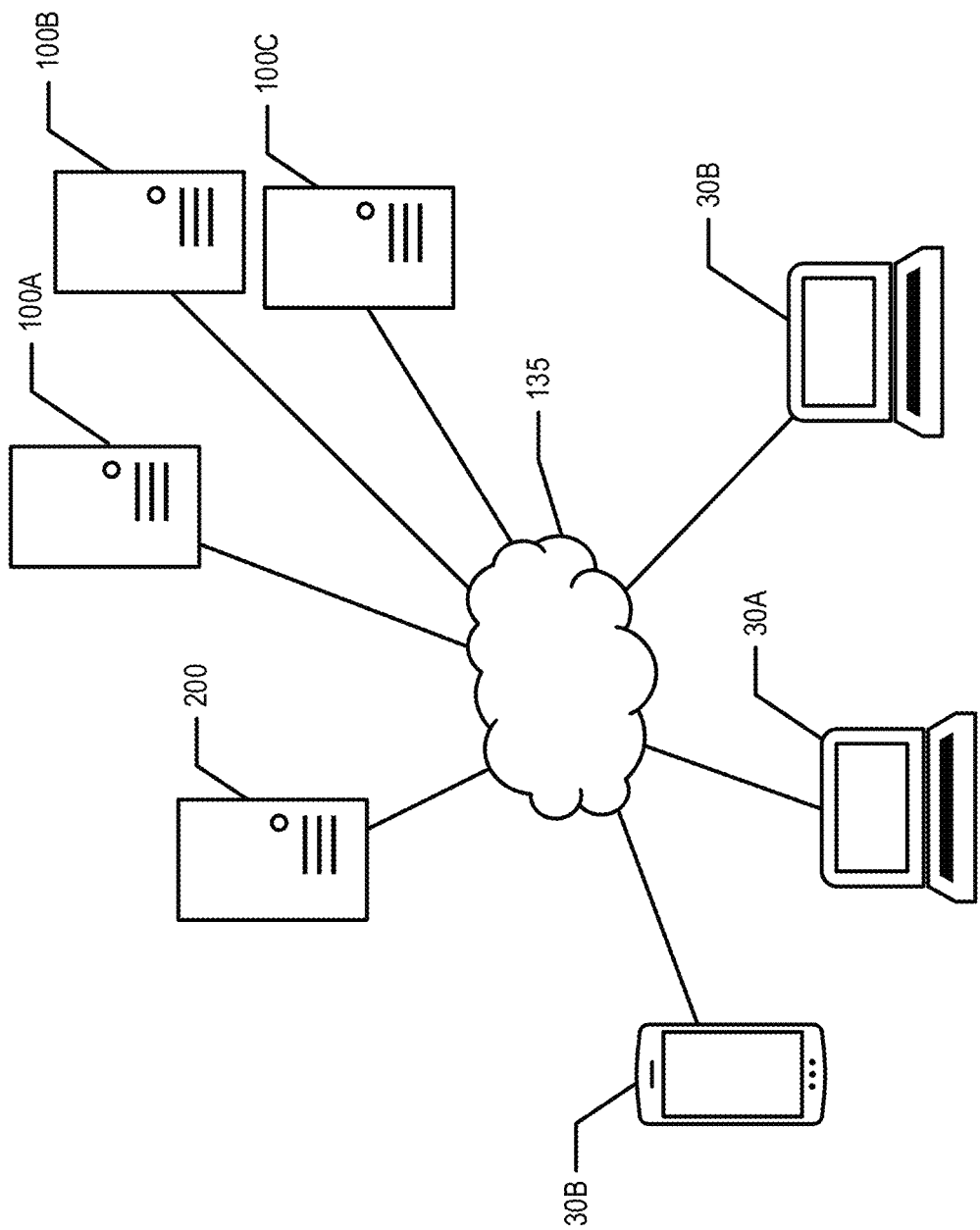
FIG. 1 is a diagram of a system that can be used to practice various embodiments of the present invention.

FIG. 1 provides an illustration of a system that can be used in conjunction with various embodiments of the present invention. As shown in FIG. 1, the system may comprise a one or more data collection computing entities 100, one or more analysis computing entities 200, one or more user computing entities 30 (e.g., 30A, 30B), one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), or the like. Additionally, while FIG. 1 illustrate certain system entities as separate, standalone entities, the various embodiments are not limited to this particular architecture.

a. Exemplary Analysis Computing Entity

Figure 2:
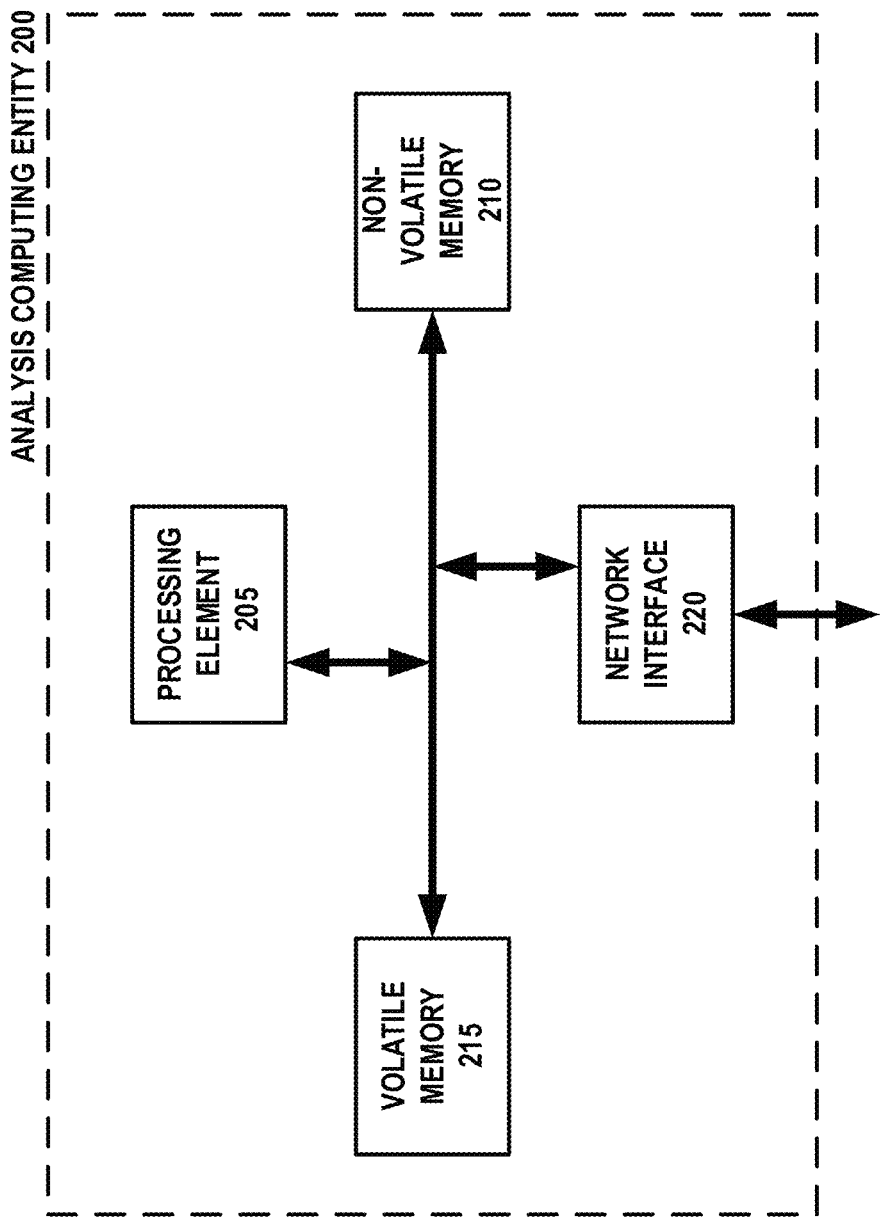
FIG. 2 is a schematic of an analysis computing entity in accordance with various embodiments of the present invention.

FIG. 2 provides a schematic of an analysis computing entity 200 according to one embodiment of the present invention. In various embodiments, an analysis computing entity 200 is operated by and/or on behalf of an organization, department of a corporation, and/or the like. For example, the organization, department of a corporation, and/or the like corresponding to a plurality of teams. In various embodiments, an analysis computing entity 200 is configured to train a recommendation model using one or more machine learning algorithms; receive and analyze performance information/data corresponding to determine one or more metrics corresponding to KPIs; operate the recommendation model to identify coaching opportunities, determine a priority for completing coaching opportunities, determine a recommendation for completing coaching opportunities, and/or generating pre-filled coaching forms; providing metrics, prioritized coaching opportunities and/or action items, recommendations for completing prioritized coaching opportunities, pre-filled coaching forms, and/or the like.

In general, the terms analysis computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the analysis computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the analysis computing entity 200 may communicate with one or more data collection computing entities 100, one or more user computing entities 30, and/or the like.

As shown in FIG. 2, in one embodiment, the analysis computing entity 200 may include or be in communication with one or more processing elements 205 (also referred to as processors, processing circuitry, and/or similar terms used herein interchangeably) that communicate with other elements within the analysis computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analysis computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the analysis computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the analysis computing entity 200 with the assistance of the processing element 205 and operating system.

As indicated, in one embodiment, the analysis computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the analysis computing entity 200 may communicate with communication interfaces of one or more user computing entities 30, one or more data collection computing entities 100, and/or the like.

As indicated, in one embodiment, the analysis computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analysis computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analysis computing entity's 200 components may be located remotely from other analysis computing entity 200 components, such as in a distributed system. Furthermore, one or more of the components may be combined and additional components performing functions described herein may be included in the analysis computing entity 200. Thus, the analysis computing entity 200 can be adapted to accommodate a variety of needs and circumstances.

b. Exemplary User Computing Entity

Figure 3:
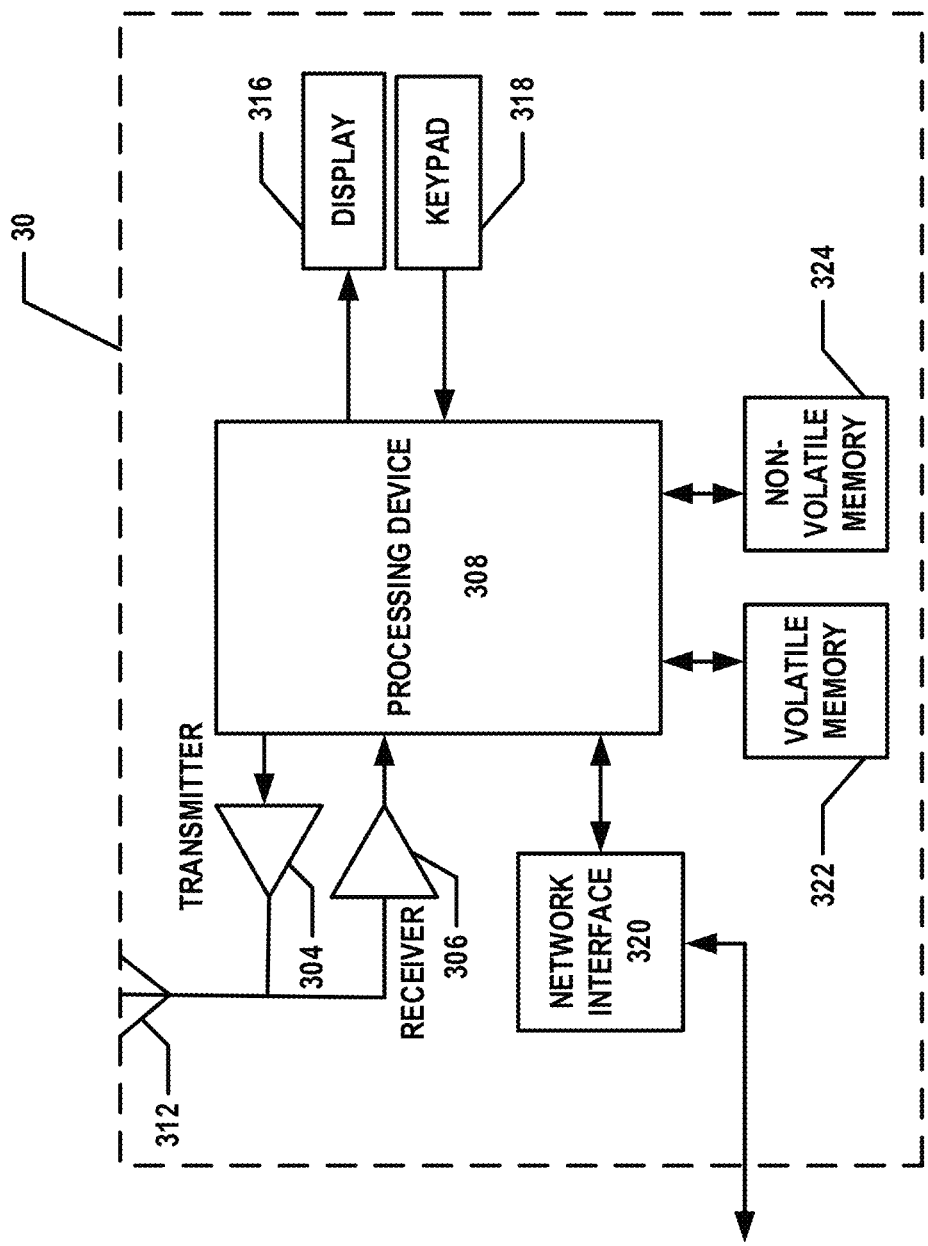
FIG. 3 is a schematic of user computing entity in accordance with various embodiments of the present invention.

FIG. 3 provides an illustrative schematic representative of a user computing entity 30 that can be used in conjunction with embodiments of the present invention. In various embodiments, a user computing entity 30 is operated by a user (e.g., team leader, team member, and/or the like) that is associated with a team of the organization, department of a corporation, and/or the like associated with the analysis computing entity 200. In an example embodiment, a user computing entity 30 is a client or thin client of an analysis computing entity 200, and/or server in communication with the analysis computing entity 200.

As shown in FIG. 3, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an analysis computing entity 200, one or more other user computing entities 30, one or more data collection computing entities 100, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing device 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output devices/interfaces (e.g., a display 316 and/or speaker/speaker driver coupled to a processing element 308 and a touch screen, keyboard, mouse, and/or microphone coupled to a processing element 308). For example, the user output device/interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input devices/interfaces. The user input device/interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

In example embodiments, the user computing entity 30 may be in communication, via a network interface 320, with one or more analysis computing entities 200, one or more data collection computing entities 100, and/or one or more other user computing entities 30.

c. Exemplary Data Collection Computing Entity

In an example embodiment, a data collection computing entity 100 may be a computing entity configured for collecting, storing, and/or providing performance information/data corresponding to a team and/or team members of the team. For example, in an example embodiment, a data collection computing entity 100 may monitor whether one or more team members meet one or more deadlines and/or perform one or more scheduled actions in accordance with the date and time corresponding to the scheduled action; conduct client/customer surveys to capture performance information/data of a team member interaction with the clients/customers; monitor data flows between user computing entities 30 and one or more other computing entities to ensure the data flows are in accordance with established procedures; and/or the like.

In an example embodiment, a data collection computing entity 100 may be in communication with one or more analysis computing entities 200, one or more user computing entities 30, one or more other data collection computing entities, and/or other computing entities via one or more wired or wireless networks 135. In one embodiment, the data collection computing entity 100 may include one or more components that are functionally similar to those of an analysis computing entity 200 and/or user computing entity 30. For example, in one embodiment, a data collection computing entity 100 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135. For example, the data collection computing entity 100 may capture performance information/data and provide the (e.g., transmit) performance information/data to an analysis computing entity 200.

d. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY SYSTEM OPERATION

In various embodiments, a team leader IUI is provided via a user interface of a team leader user computing entity 30A. In various embodiments, the team leader IUI is configured to provide team leaders with a prioritized list of action items along with other information/data corresponding to team member and team performance. In various embodiments, the IUI provides team and/or team member metrics corresponding to KPIs. In various embodiments, the metrics are determined by analyzing performance information/data. In various embodiments, the team and/or team member metrics are real time and/or near real time metrics. For example, the performance information/data corresponding to the team and/or individual team members may be analyzed periodically (e.g., every hour, every two hours, and/or the like) and the metrics may be updated accordingly. In various embodiments, action items of the list of action items and/or a priority of the action items within the list of action items may be determined based at least in part on one or more of the metrics. In various embodiments, the relative priority of action items of the list of action items is used to determine the order in which the action items are presented in the list of action items within the IUI. In an example embodiment, a recommendation as to how to complete one or more action items is provided. For example, at least some of the action items may correspond to coaching opportunities. In various embodiments, a coaching opportunity may correspond to a single defect in a team or team member's performance (e.g., missing a single deadline), one or more comprehensive metric values (e.g., a metric corresponding to multiple tasks/interactions being below a goal level), a trend in one or more metric values, and/or the like. In certain embodiments, a coaching opportunity may be identified based on an elapsed time since a prior coaching opportunity regarding the same topic, and thus, coaching opportunities may be based at least in part on a current time. As a specific example, a coaching opportunity may be identified for good communication practices if a similar coaching opportunity has not arisen within the past 6 months.

As used herein, a coaching opportunity is a situation identified (e.g., by a recommendation model operating on an analysis computing entity 200) where team leader coaching is likely to contribute to improvements and/or maintenance of team or team member performance relative to a goal level (e.g., as measured via one or more metrics corresponding to KPIs). In various embodiments, team leader coaching may include any coaching activities and/or performance-related communication between the team leader and one or more team members associated with the coaching opportunity. For example, the team leader may coach one or more team members via email, instant messenger, by providing a hard copy or electronic copy of a coaching form, voicemail, telephone, in person, and/or the like. In an example embodiment, the coaching opportunity may be a positive feedback opportunity and the team leader may coach the associated team member(s) by providing positive feedback (e.g., Congratulations on making goal XYZ!, Thank you for your work on this!, etc.). In an example embodiment, the coaching opportunity may require the team leader to provide training regarding a particular procedural matter, a reminder regarding a procedural matter, a reminder of what is required to meet one or more goals, minor disciplinary action, tips regarding how to improve the team member(s) performance, and/or the like. In various embodiments, the coaching provided by the team leader may be based on and recorded (e.g., for various organizational records) using a coaching form. In an example embodiment, the coaching form is a form comprising information/data corresponding a coaching session. A coaching session is the interaction and/or communication through which the team leader coaches one or more team member(s). In an example embodiment, a coaching form comprises fields corresponding to information/data identifying the team leader, the one or more team members associated with the coaching session, one or more metrics corresponding to identifying of the coaching opportunity, feedback for providing during the coaching session (e.g., positive feedback, suggestions for improvement, procedural matter information/data, and/or the like), a date and time of the coaching session, and/or other information/data corresponding to the coaching session. In certain embodiments, a coaching form may be automatically generated for a particular coaching opportunity, by retrieving a blank coaching form from a memory storage area (e.g., comprising person-agnostic data regarding a coaching opportunity) and populating identifying data regarding the one or more individuals associated with the coaching opportunity (e.g., the team leader and the team member). In an example embodiment, a team leader may choose to forgive a coaching opportunity (e.g., choose to not address the coaching opportunity with the team and/or associated team member(s)) and/or choose to rebut a coaching opportunity (e.g., choose to argue against the coaching opportunity and/or provide additional contextual information/data corresponding to one or more metrics used to identify the coaching opportunity). Such coaching actions may be reflected by user input provided by the team leader to the IUI, thereby enabling the recommendation engine may receive data indicative of the coaching activity utilized for a particular coaching opportunity, which may enable the identification and recommended coaching activities for future coaching opportunities to be refined (e.g., via updates to machine-learning models).

In various embodiments, the team leader IUI provides a recommendation regarding how to address a coaching opportunity. For example, the team leader IUI may provide a coaching opportunity and a recommended strategy for responding to the coaching opportunity, including a recommended coaching action (e.g., provide positive feedback, address, forgive, and/or rebut). In an example embodiment, the recommendation may be determined using a recommendation model trained using machine learning. In an example embodiment, a set of teams may be clustered based on overlapping KPIs used to monitor the team's performance and/or overlapping priorities. Completed coaching opportunities, indicative of a coaching activity performed (e.g., identified based on user input provided by a team leader who performed the coaching activity) and an outcome indicator corresponding to the outcome of each of the coaching opportunities for teams of a cluster may be used to train a recommendation model for the corresponding cluster of teams. In various embodiments, a completed coaching opportunity is a coaching opportunity in which the team leader has performed a coaching activity, such as provided positive feedback, addressed the coaching opportunity, chosen to forgive the coaching opportunity, a rebuttal process has been completed, and/or the like. In an example embodiment, the outcome indicator may be determined within minutes of coaching opportunity being completed (e.g., within minutes of the team leader providing user input indicative of the completion of the coaching opportunity), one or more hours after the coaching opportunity has been completed, one or more days after the coaching opportunity has been completed, and/or the like. Through the training of the recommendation model based on data (e.g., user input, completed coaching forms, and/or the like) corresponding to completed coaching opportunities and the corresponding outcome indicators, the recommendation model learns to determine a recommendation for responding to various coaching opportunities that are most likely to lead to improving team and/or team member performance and/or maintaining of team and/or team member performance above a goal level. In various embodiments, the recommendation model may be further configured to determine recommendations regarding which metrics are most important for a team and/or team member to achieve one or more goals and/or to avoid one or more coaching opportunities from being initiated/identified. In various embodiments, the recommendation model may be further configured to pre-fill a coaching form to provide the team leader with information/ data regarding the problem to be addressed (e.g., the one or more metrics and/or the like that triggered the coaching opportunity, trend(s) in one or more metrics that triggered the coaching opportunity, and/or the like) and how the problem may be addressed (e.g., suggestions for improving performance, training materials to be used, and/or the like). The recommendation model may be further configured to accommodate leader-identified coaching opportunities and/ or leader-determined best methods for addressing system-identified coaching opportunities. For example, the recommendation model may be configured to receive user input from a leader (e.g., provided to the leader IUI) requesting a coaching form, even when no coaching opportunities are identified by the recommendation model. Thus, a leader may provide data indicative of a leader-identified coaching opportunity, as well as data indicative of the method utilized to address the coaching opportunity via the coaching form. As another example, a leader may modify pre-filled data within an automatically generated coaching form, for example, if the leader determines that a methodology not recommended by the recommendation model is most appropriate for addressing the coaching opportunity. In other words, the recommendation model is flexible to accommodate user decisions for various coaching opportunities that may not be specifically identified within the recommendation model itself.

In various embodiments, the team leader IUI may be configured to provide a convenient dashboard through which the team leader may efficiently monitor team and/or individual team member performance (e.g., via one or more metrics corresponding to KPIs) and determine the most efficient way for improving team and/or team member performance in accordance with the priorities of the team. As individuals may be associated with a corresponding team (each team comprising one or more individuals), for example, based at least in part on a user identifier associated with a particular individual being logically associated with a team identifier, the performance of a particular individual may be attributed to the overall performance of a team, thereby enabling a team leader IUI to present both individual-specific performance data as well as team-level performance data for a user. In particular, various embodiments provide significant improvements over the art by not only providing a team leader with a list of action items ordered based on the priorities of the team, but by also providing a recommendation regarding how the team leader may address an action item to most effectively improve the performance of the team and/or team member(s) and/or to maintain the performance of the team and/or team member(s) above a goal level. In various embodiments, the team leader IUI may provide the team leader with graphical representations of one or more metrics corresponding to KPIs for the team and/or individual team members, graphical representations of trends in one or more metrics corresponding to KPIs for the team and/or individual team members, goal achievement information/data (and/or a graphical representation thereof) regarding which metrics are most important for achieving one or more team and/or team member goals, and/or the like. In various embodiments, the goal achievement information/ data is determined and/or generated by the recommendation model (e.g., operating on the analysis computing entity 200). Thus, various embodiments aid in improving the efficiency with which team leaders may address coaching opportunities and well as improving team leader efficacy in identifying and addressing coaching opportunities.

In various embodiments, a team member IUI is provided via a user interface of a team member user computing entity 30B. In an example embodiment, the team member IUI may provide the corresponding team member with metrics (and/ or a graphical representation thereof) indicating the team member's performance. In an example embodiment, the metrics may be updated in real time and/or near real time, updated periodically (e.g., every hour, every other hour, and/or the like), and/or the like. In an example embodiment, the team member IUI may provide the corresponding team member with information/data (and/or a graphical representation thereof) corresponding to trends in metrics corresponding to the team member's performance and the evolution of the team member's performance over time. In an example embodiment, the team member IUI provides the team member with coaching prevention information/data. In an example embodiment, the coaching prevention information/data is generated and provided by the recommendation model. In an example embodiment, the coaching prevention information/data provides the team member with information/data regarding actions that the team member may take, one or more metrics the user should work to improve, and/or the like to prevent a coaching opportunity corresponding to the team member from being identified. In an example embodiment, the team member IUI may provide personal goal achievement information/data (and/or a graphical representation thereof). In an example embodiment, the personal goal achievement information/data may be generated and provided by the recommendation model (e.g., operating on the analysis computing entity 200). In an example embodiment, the personal goal achievement information/ data indicates which metrics and/or actions are most important for achieving one or more team member goals given the team members performance history.

a. Exemplary Recommendation Model

In various embodiments, a recommendation model is configured to receive performance information/data corresponding to one or more team members. For example, the recommendation model may be configured to receive current performance information/data and/or historical performance information/data (e.g., performance information/data from the past work day, the past week, the past month, the past year, the past two or more years, and/or the like). The performance information/data may be captured and/or provided by one or more data collection computing entities 100. In various embodiments, a recommendation model is configured to generate and provide one or more of team goal achievement information/data, personal goal achievement information/data, coaching prevention information/data, coaching opportunity information/data (e.g., corresponding to coaching opportunities identified by the recommendation model), recommendations for completing coaching opportunities, priorities corresponding to coaching opportunities (e.g., corresponding to and/or based on team goals of the team), coaching forms corresponding to coaching opportunities, and/or the like. In an example embodiment, the recommendation model is trained using one or more machine learning algorithms. In various embodiments a goal may correspond to a metric. In an example embodiment, a goal includes a goal level and a minimal acceptable level. For example, a goal for metric A may indicate that the goal level for metric A is 95% and the minimal acceptable level for metric A is 85%. Thus, in an example embodiment, if the metric A value for a first team member is greater than 95%, a positive feedback opportunity corresponding to the first team member may be identified. In an example embodiment, if the metric A value for a second team member is less than 85%, a coaching feedback opportunity corresponding to the second team member may be identified to suggest that the team leader provide recommendations and/or the like as to how the second team member may improve their metric A value. As discussed herein, the feedback opportunities are reflected within user interface elements displayed within a team leader IUI.

In various embodiments, an organization, department of a corporation, and/or the like comprises a plurality of teams. Each team is associated with one or more KPIs and one or more goals (e.g., corresponding to the one or more KPIs and/or metrics corresponding to the one or more KPIs). In an example embodiment, the one or more goals associated with a team may be associated with relative importances. For example, a first goal may be of higher importance and should be completed during each goal term (e.g., each day, week, month, year, and/or the like) and a second goal may be of lower importance and may more of a "pie in the sky" goal. In various embodiments, teams are identified that are associated with overlapping sets of KPIs and/or overlapping goals. For example, one or more clusters of teams may be generated wherein each team within a particular cluster is associated with one or more of the same KPIs and/or one or more of the same goals. For example, Team A may be associated with KPIs X, Y, and Z and goals α, β, and γ; Team B may be associated with KPIs W, X, and Y and goals α and β; and Team C may be associated with KPIs Y and Z and goals β and γ. In an example embodiment, Team A, Team B, and Team C may be clustered together (e.g., utilizing a common cluster identifier associated with each team) as similar teams due to the overlapping of the KPIs associated with each team and/or the overlapping of goals associated with each team.

A recommendation model corresponding to a cluster of teams (e.g., having the same cluster identifier as each team in the cluster of teams) may then be trained based on completed coaching opportunities corresponding to the cluster of teams. For example, information/data corresponding to completed coaching opportunities corresponding to teams within the cluster of teams may be accessed and used to train the recommendation model using one or machine learning algorithms. For example, the information/data corresponding to a completed coaching opportunity comprises a coaching form and one or more outcome indicators for the completed coaching opportunity, in an example embodiment. In an example embodiment, the coaching form is a form (e.g., an electronically fillable form comprising a plurality of fillable form fields) comprising information/data corresponding to a coaching session. The coaching form may comprise one or more free-form text fields enabling a user (e.g., a team leader) to enter free form text therein; one or more alternatively-selectable options (e.g., rating choices, such as "poor," "fair," "acceptable," and/or "excellent"); and/or the like. The recommendation model may be configured to interpret inputs of the coaching form to determine model outputs. A coaching session is the interaction and/or communication through which the team leader coaches the team and/or team member(s). In an example embodiment, a coaching form comprises fields corresponding to information/data identifying the team leader (e.g., via a unique identifier associated with the team leader), the one or more team members associated with the coaching session (e.g., via unique identifiers corresponding to each of the one or more team members associated with the coaching session), one or more metrics corresponding to identifying of the coaching opportunity, feedback for providing during the coaching session (e.g., positive feedback, suggestions for improvement, procedural matter information/data, and/or the like, which may be provided as free-form text, selections of feedback options, and/or the like), a date and time of the coaching session, and/or other information/data corresponding to the coaching session. In an example embodiment, the outcome indicator may be determined within minutes of coaching opportunity being completed, one or more hours after the coaching opportunity has been completed, one or more days after the coaching opportunity has been completed, and/or the like. In an example embodiment, the outcome of the coaching opportunity may be determined by comparing one or more metrics and/or metric trends corresponding to the team member(s) associated with the completed coaching opportunity before and after the coaching opportunity. For example, an outcome indicator may indicate that the outcome of a completed coaching opportunity improved one or more particular metrics, did not improve one or more particular metrics (the coaching opportunity maintained the status quo), that one or more metrics deteriorated, and/or the like. Through the training of the recommendation model based on coaching forms corresponding to completed coaching opportunities and the corresponding outcome indicators, the recommendation model learns to determine a recommendation for responding to various coaching opportunities that are most likely to lead to improving team and/or team member performance and/or maintaining of team and/or team member performance above a goal level.

In an example embodiment, the recommendation model may be configured to identify coaching opportunities by analyzing performance information/data to determine one or more metrics corresponding to one or more KPIs and indicating the performance of a team and/or one or more team members and analyzing the determined metrics based on one or more team and/or team member goals. The recommendation model may then determine a recommendation for completing the coaching opportunity (e.g., forgiving the coaching opportunity, addressing the coaching opportunity with a coaching session, providing positive feedback, and/or other coaching activities). In various embodiments, if the recommendation is to address the coaching opportunity with a coaching session and/or user input is received (e.g., via a user interface of a team leader user computing entity 30A) indicating the team leader has requested a coaching form corresponding to the coaching opportunity, the recommendation model is configured to generate a coaching form having one or more fields populated. For example, the recommendation model may automatically populate one or more administrative fields of the coaching form (e.g., team identifier, team member(s) name(s)/identifier(s), team leader name/identifier, date and/or time, and/or the like) and one or more substantive fields of the coaching form (e.g., basis for identifying the coaching opportunity, feedback to be given to team member(s), and/or the like). In an example embodiment, the feedback to be given to team member(s) may be generated via natural language processing, may be a reference to one or more passages in a handbook and/or another reference material, selected from a list of tips, and/or the like.

FIG. 4 provides a flowchart illustrating various operations of an analysis computing entity 200 to train and operate a recommendation model, in accordance with an example embodiment. At step/operation 402, team information/data for each of a plurality of teams is received. For example, the analysis computing entity 200 may receive (e.g., via a communication interface 220, a user interface, and/or the like) team information/data for each of a plurality of teams. In various embodiments, the team information/data for a team comprises a team identifier, one or more KPIs for the team, one or more goals for the team, priorities corresponding to one or more of the goals for the team, and/or the like. In certain embodiments, individual team members may be associated with a team (e.g., based at least in part on a team identifier associated with each individual team member), such that attributes and/or actions of individual team members may be attributed to the team. For example, each individual team member may have a corresponding member identifier, which may be associated with the corresponding team identifier.

At step/operation 404, clusters of teams are generated. For example, the analysis computing entity 200 identifies teams having overlapping KPIs and/or overlapping goals. Clusters may then be generated that consist of teams that have mutually overlapping KPIs and/or mutually overlapping goals. In an example embodiment, each team within a cluster has the same set of KPIs and/or the same set of goals. In an example embodiment, each team within a cluster has at least one particular KPI and/or at least one particular goal. In an example embodiment, each team in a cluster may have the same one or more highest priority goals. In an example embodiment, each team within a first cluster is associated with a cluster identifier configured to identify the first cluster.

At step/operation 406, the recommendation model is trained for a particular cluster of teams. In various embodiments, the model is operated on the analysis computing entity 200 in a training mode. In an example embodiment, the model is trained using historical performance information/data for one or more teams of the particular cluster of teams, coaching forms and corresponding outcome indicators corresponding to completed coaching opportunities corresponding to teams of the particular cluster of teams, one or more team member or team goals of the cluster of teams, and/or the like. For example, historical performance information/data for one or more teams of the particular cluster of teams, coaching forms and corresponding outcome indicators corresponding to completed coaching opportunities corresponding to teams of the particular cluster of teams, one or more team member or team goals of the cluster of teams, and/or the like may be accessed and a training data set may be generated therefrom. In various embodiments, the recommendation model may be designed and/or trained as a long short-term memory network, recurrent neural network, a support vector machine, a decision tree model, a logistic regression, and/or the like. In various embodiments, the recommendation model may be trained to receive current and/or historical performance information/data as input and provide as output one or more of team goal achievement information/data, personal goal achievement information/data, coaching prevention information/data, coaching opportunity information/data (e.g., corresponding to coaching opportunities identified by the recommendation model), recommendations for completing coaching opportunities, priorities corresponding to coaching opportunities (e.g., corresponding to and/or based on team goals of the team), coaching forms corresponding to coaching opportunities, and/or the like. In an example embodiment, the recommendation model is trained to receive raw performance information/data as input. In an example embodiment, the recommendation model is trained to receive performance information/data that has been pre-processed into one or more metrics as input. For example, the recommendation model may be trained to receive one or more current and/or historical metrics for one or more team members as input.

In various embodiments, the recommendation model comprises an input layer comprising a plurality of input nodes. Each of the input nodes are configured to receive one or more elements of performance information/data and/or one or more metrics corresponding to one or more team members. For example, performance information/data may comprise customer feedback information/data (e.g., received from a customer feedback and compliance system correlating customer feedback with a user identifier of a particular individual). In various embodiments, the recommendation model comprises an output layer comprising a plurality of output nodes. Each of the output nodes is configured to provide one or more of team goal achievement information/data, personal goal achievement information/data, coaching prevention information/data, coaching opportunity information/data (e.g., corresponding to coaching opportunities identified by the recommendation model), recommendations for completing coaching opportunities, priorities corresponding to coaching opportunities (e.g., corresponding to and/or based on team goals of the team), coaching forms (e.g., coaching activities) corresponding to coaching opportunities, and/or the like. Between the input layer and the output layer, the recommendation model comprises at least one hidden layer. The at least one hidden layer comprises a plurality of nodes that are linked to one or more nodes of a preceding layer and/or to one or more nodes of a succeeding layer, wherein a layer that is closer to the input layer than a first hidden layer precedes the first hidden layer and a layer that is closer to the output layer than the first hidden later succeeds the first hidden layer. The weight of the links to the one or more nodes of the preceding layer and/or to one or more nodes of the succeeding layer are modified and/or evolved through the training of the recommendation model. For example the weight of the links between various nodes are modified and/or evolved through the training of the recommendation model such that the recommendation model may accurately mimic and/or predict one or more outcome indicators corresponding to a completed coaching opportunity of the training data set based on the corresponding input (e.g., coaching form, performance information/data, and/or the like).

Once the recommendation model is trained to an administrator approved state, convergence level, and/or the like, the recommendation model may be used to analyze performance information/data and/or metrics in order to generate information/data that may be provided via the team leader IUI (and/or team member IUI). For example, at step/operation 412, performance information/data is received. For example, the analysis computing entity 200 may receive performance information/data corresponding to one or more team members and/or one or more teams. In an example embodiment, the performance information/data is provided by one or more data collection computing entities 100 such that the analysis computing entity 200 receives the performance information/data. In an example embodiment, the analysis computing entity 200 receives raw performance information/data and provides the raw performance information/data as input to the recommendation model. In an example embodiment, the analysis computing entity 200 receives raw performance information/data, pre-processes the raw performance information/data to generate one or more metrics corresponding to KPIs therefrom, and provides the one or metrics as input to the recommendation model. In an example embodiment, the analysis computing entity 200 receives pre-processed performance information/data comprising one or more metrics corresponding to one or more KPIs and provides the one or more metrics as input to the recommendation model. In various embodiments, the performance information/data provided as input to the recommendation model is real time and/or near real time performance information/data corresponding to one or more team members, the performance information/data corresponding to the one or more team members captured and/or collected since the last time performance information/data corresponding to the one or more team members was analyzed via the recommendation model, and/or the like. For example, new (e.g., not previously analyzed via the recommendation model) performance information/data corresponding to one or more team members may be provided as input to the recommendation model on a periodic basis (e.g., every hour, every other hour, and/or the like through the work day and/or the team member(s) shift(s)). In various embodiments, historical performance data corresponding to the one or more team member(s) may also be provided as input to the recommendation model.

At step/operation 414, the performance information/data is analyzed via the recommendation model. For example, the analysis computing entity 200 may operate and/or execute the recommendation model to analyze the performance information/data. In various embodiments, at step/operation 416, the recommendation model may identify one or more coaching opportunities corresponding to the one or more team members. When a coaching opportunity is identified, the coaching opportunity information/data is generated and stored and a coaching opportunity identifier configured to identify the coaching opportunity is generated and assigned to the coaching opportunity (e.g., stored in association with the corresponding coaching opportunity information/data). In an example embodiment, the recommendation model may identify trends, that if continued, would likely trigger the identification of coaching opportunities corresponding to one or more team members. These trends, that if continued, would likely trigger the identification of coaching opportunities are used to generate coaching prevention information/data for the one or more team members. In various embodiments, the recommendation model may also determine, based on analysis of the performance information/data, which actions and/or metrics are most important to improve and/or maintain for completing one or more team goals based on current performance by the team (e.g., the combined performance of each of the team members) and generate corresponding team goal achievement information/data encoding such. In an example embodiment, the recommendation model may also determine, based on analysis of performance information/data corresponding to a team member, which actions and/or metrics are most important to improve and/or maintain for completing one or more team member goals based on the current performance by the team member and generate personal goal achievement information/data encoding such. In an example embodiment, the metrics, coaching opportunity information/data corresponding to identified coaching opportunities, coaching prevention information/data, and/or personal goal achievement information/data corresponding to a team member are stored in a team member profile (e.g., stored in a team member database and/or the like in memory of the analysis computing entity 200 and/or another computing entity).

At step/operation 418, the recommendation model may determine recommendations for completing the identified coaching opportunities and a priority for completing each of the identified coaching priorities. In an example embodiment, priorities for completing coaching opportunities may be determined for the coaching opportunities just determined as well as any other coaching opportunities pending for the corresponding team leader. For example, if a team leader of a team has three pending coaching opportunities corresponding to one or more members of the team, and two coaching opportunities for team members of the team leader's team were identified at step/operation 416, the relative priorities of the resulting five coaching opportunities corresponding to the team leader may be determined. In various embodiments, the recommendation model may determine a recommendation for responding to each identified coaching opportunity. For example, the recommendation model may determine whether providing positive feedback, forgiving the coaching opportunity (e.g., the team member performance that lead to the identification of the coaching opportunity), or addressing the coaching opportunity with a coaching session is most likely to improve the performance of the team and/or team member(s) and/or cause the performance of the team and/or team member(s) to be maintained above a goal level (e.g., with one or more metrics satisfying one or more goals of the team).

In an example embodiment, the recommendation model may generate a coaching form for each identified coaching opportunity. In an example embodiment, the recommendation model may generate a coaching form for each identified coaching opportunity corresponding to a recommendation of positive feedback and/or addressing the coaching opportunity with a coaching session. For example, the recommendation model may generate a coaching form for each of one or more coaching opportunities and populate one or more fields of the coaching form to generate a pre-filled coaching form (e.g., from the view point of the team leader). For example, the recommendation model may populate one or more administrative fields of the coaching form (e.g., team identifier, team member(s) name(s)/identifier(s), team leader name/identifier, date and/or time, and/or the like) and one or more substantive fields of the coaching form (e.g., basis for identifying the coaching opportunity, feedback to be given to team member(s), and/or the like). In an example embodiment, the feedback to be given to team member(s) may be generated via natural language processing, may be a reference to one or more passages in a handbook and/or another reference material, selected from a list of tips, and/or the like. In various embodiments, the generated coaching forms, team goal achievement information/data, personal goal achievement information/data, coaching prevention information/data, coaching opportunity information/data, recommendations for completing coaching opportunities, priorities corresponding to coaching opportunities are stored in memory by the analysis computing entity 200, provided to a data collection computing entity 100 for storage in memory thereof, and/or the like.

At step/operation 420, team goal achievement information/data, personal goal achievement information/data, coaching prevention information/data, coaching opportunity information/data, recommendations for completing coaching opportunities, priorities corresponding to coaching opportunities, and/or the like may be provided. For example, the analysis computing entity 200 may provide one or more of team goal achievement information/data, personal goal achievement information/data, coaching prevention information/data, coaching opportunity information/data, recommendations for completing coaching opportunities, priorities corresponding to coaching opportunities, and/or the like such that a corresponding team leader user computing entity 30A and/or team member user computing entity 30B receives the provided information/data. For example, a team leader user computing entity 30A may receive the information/data provided by the analysis computing entity 200 and provide at least a portion of the information/data (and/or graphic representations thereof) via the team leader IUI provided through the user interface of the team leader user computing entity 30A. For example, a team member user computing entity 30B may receive the information/data provided by the analysis computing entity 200 and provide at least a portion of the information/data (and/or graphic representations thereof) via the team member IUI provided through the user interface of the team member user computing entity 30B.

At step/operation 422, it is determined if a request for a coaching form has been received. For example, the analysis computing entity 200 may determine if a request for a coaching form has been received. For example, a team leader operating a team leader user computing entity 30A may select a selectable IUI element via the user interface to indicate that the team leader is requesting a coaching form for a coaching opportunity corresponding to the selected selectable IUI element. The team leader user computing entity 30A may, in response to the receipt of the user input via the IUI selecting the selectable element, provide a request for the coaching form such that the request for the coaching form is received by the analysis computing entity 200. In an example embodiment, the request may identify the corresponding coaching opportunity for which the coaching form is being requested may be identified via the corresponding coaching opportunity identifier. When, at step/operation 424, it is determined that a request for a coaching form has been received, if the coaching form has not yet been generated, the coaching form is generated and one or more fields (e.g., administrative and substantive fields) are populated and the pre-filled coaching form is provided such that the team leader user computing entity 30A that submitted the request receives the pre-filled coaching form. When it is determined that a request for a coaching form has been received, if the coaching form has already been generated (e.g., the coaching form has been generated and one or more fields (e.g., administrative and substantive fields) were populated), the pre-filled coaching form is provided such that the team leader user computing entity 30A that submitted the request receives the pre-filled coaching form.

When it is time to update the metrics, coaching opportunities, and/or the like for the team and/or one or more team members due to a time period corresponding to the periodic update cycle passing, the process returns to step/operation 412 and the new performance information/data corresponding to the team and/or one or more team members is received and provided as input to the recommendation model.

In various embodiments, the recommendation model may continue to be trained after the initial training. For example, on a periodic basis (e.g., once a day, once a week, once a month, and/or the like) a training mode of the recommendation model may be initiated and the recommendation model may be trained on a batch of coaching forms and the corresponding outcome indicators for coaching opportunities that have been completed (and/or for which outcomes have been determined) since the last training of the recommendation model. Thus, in an example embodiment, the recommendation model may continue to be trained and refined to identify coaching opportunities and provide recommendations for completing coaching opportunities (including coaching forms) that more efficiently and more effectively improve the performance of one or more teams and/or team members.

b. Exemplary Operation of a Team Leader User Computing Entity

In various embodiments, a team leader may operate a team leader user computing entity 30A. For example, a team leader may log in (e.g., using a username and password, biometric authentication, two factor authentication, and/or the like) to the team leader user computing entity 30A, an application operating on the team leader user computing entity 30A, and/or a portal accessed via the team leader user computing entity 30A (e.g., via a web browser, dedicated application, and/or the like) to access a team leader IUI corresponding to the team leader. In various embodiments, the team leader IUI is personalized for the team leader accessing the team leader IUI. For example, the team leader is associated with a team and the team leader IUI provided to the team leader (e.g., via the user interface of the team leader user computing entity 30A) provides metrics corresponding to the team and/or team members of the team, a prioritized list of action items corresponding to the team and/or team members of the team, a list of team members ordered based on the importance of the team leader addressing one or more actions corresponding to the team member, and/or the like.

In various embodiments, the team leader user computing entity 30A, analysis computing entity 200, and/or another computing entity in communication with the team leader user computing entity 30A may execute computer-readable application code to cause the team leader IUI to be provided via the user interface of the team leader user computing entity 30A. For example, the team leader may log in to and/or access the team leader user computing entity 30A and open and/or log in to a browser or dedicated application to cause the computer-readable application code to be executed by the team leader user computing entity 30A, analysis computing entity 200, and/or another computing entity in communication with the team leader user computing entity 30A such that the team leader IUI is provided via the user interface of the user computing entity 30A. For example, the team leader IUI may be displayed via the display 316.

Figure 5:
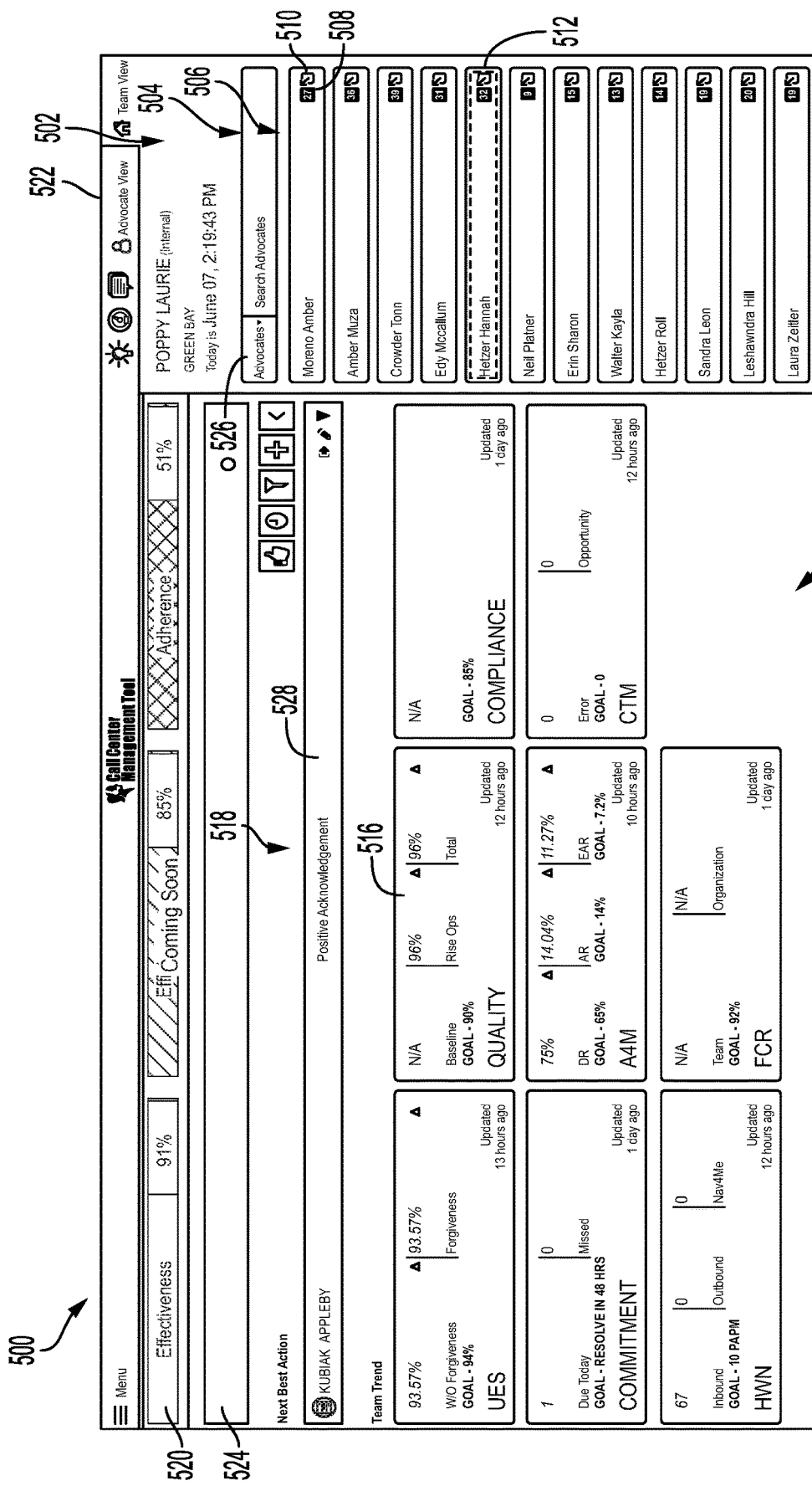

FIGS. 5-6, 7B-7B, 8-9, and 12 provide various example views of a team leader IUI and/or portions thereof. FIG. 5 illustrates an example view of a team tab 500 of a team leader IUI. In an example embodiment, the team leader IUI may comprise a team tab and a team member tab. The team tab may provide information/data regarding the team in general and, in some instances information/data regarding the performance of one or more team members. The team member tab may provide information/data corresponding to a team leader selected individual team member. In the illustrated embodiment, a team tab 500 of a team leader IUI comprises a team leader information/data section 502, a team member search element 504, and a team member list 506. In various embodiments, the team tab 500 of the team leader IUI comprises a metric section 514, an action list section 518, a team performance overview section 520, and a ticker section 524.

In an example embodiment, the team leader information/data section 502 comprises information/data identifying the team leader and/or the corresponding team. For example, the team leader information/data section 502 may include the team leader's name and/or other team leader identifier, a location corresponding to the team (e.g., a room within a particular building, a floor or section of a floor within a particular building, a particular building, a location, city, state, country, and/or the like where the team is located/operates), a team name and/or other team identifier, and/or the like. In the illustrated embodiment, the team leader information/data section 502 also indicates the current date and time (at the location corresponding to the team).

In an example embodiment, the team member list 506 comprises team member tiles 508. For example, each team member tile corresponds to one team member of the team. The team member tile may indicate the corresponding team member's name and/or other team member identifier, a number of open coaching opportunities corresponding to the team member, and/or the like. In an example embodiment, the team member list is ordered based on an importance of the team leader addressing one or more actions corresponding to the team member. For example, the recommendation model may determine which action items are most important for the team leader to complete in order for the team to achieve its goals. The team member list may then be ordered such that team members corresponding to coaching opportunities that are more important for the team leader to complete in order for the team to achieve its goals are listed higher and/or more prominently than team members corresponding to coaching opportunities that are less important for the team leader to complete in order for the team to achieve its goals. In an example embodiment, one or more team member tiles 508 may be displayed with a team change indicator 512 (e.g., shown in FIG. 5 as a particular border around the team member tile 508) indicating that the corresponding team member has been shifted to another team but the coaching opportunities corresponding to the team member and the team leader viewing the team leader IUI have not yet been completed. Once the coaching opportunities corresponding to the team member and the team leader viewing the team leader IUI have been completed, the team member that has been moved to a different team will no longer be listed in the team member list 506 (e.g., the team member list 506 will not include a team member tile 508 corresponding to the team member that has been moved to a different team).

In an example embodiment, the team member list 506 comprises team member tiles 508, wherein a tile (e.g., such as a team member tile 508, metric tile 516, or action tile 528) is a displayable IUI element that provides information/data (e.g., a team members name, number of open coaching opportunities corresponding to the team member, and/or the like in the case of the team member tile 508). In an example embodiment, a tile may be a selectable IUI element such that selecting (e.g., clicking and/or otherwise selecting via a user input device of the user interface of the team leader user computing entity 30A) may cause the team leader IUI to provide further information/data (e.g., a team member summary 540 in the case of team member tile 508). In an example embodiment, a tile may include one or more overlay selectable IUI elements that are displayed in an overlaid manner on the tile such that selection of an overlay selectable IUI element may cause the execution of a corresponding function. For example, the overlay selectable IUI element 510 is displayed in an overlaid manner on a team member tile 508 and, when selected, causes the team member tab 900 for the team member corresponding to the team member tile 508 on which the selected overlay selectable IUI element 510 is overlaid to be provided and/or launched via the team leader IUI. In various embodiments, when a user selects (e.g., clicks on and/or otherwise selects via a user input device in communication with processing element 308 of the team leader user computing entity 30A) a selectable IUI element (e.g., a tile, an overlay selectable IUI element, or other selectable IUI element), the processing element 308 receives an indication of the selection (e.g., via the user input device). Processing the indication of the selection by the processing element 308 causes the processing element 308 to execute computer-readable code portions corresponding to the selected selectable IUI element so as to cause the team leader IUI to provide the corresponding functionality.

Figure 6:
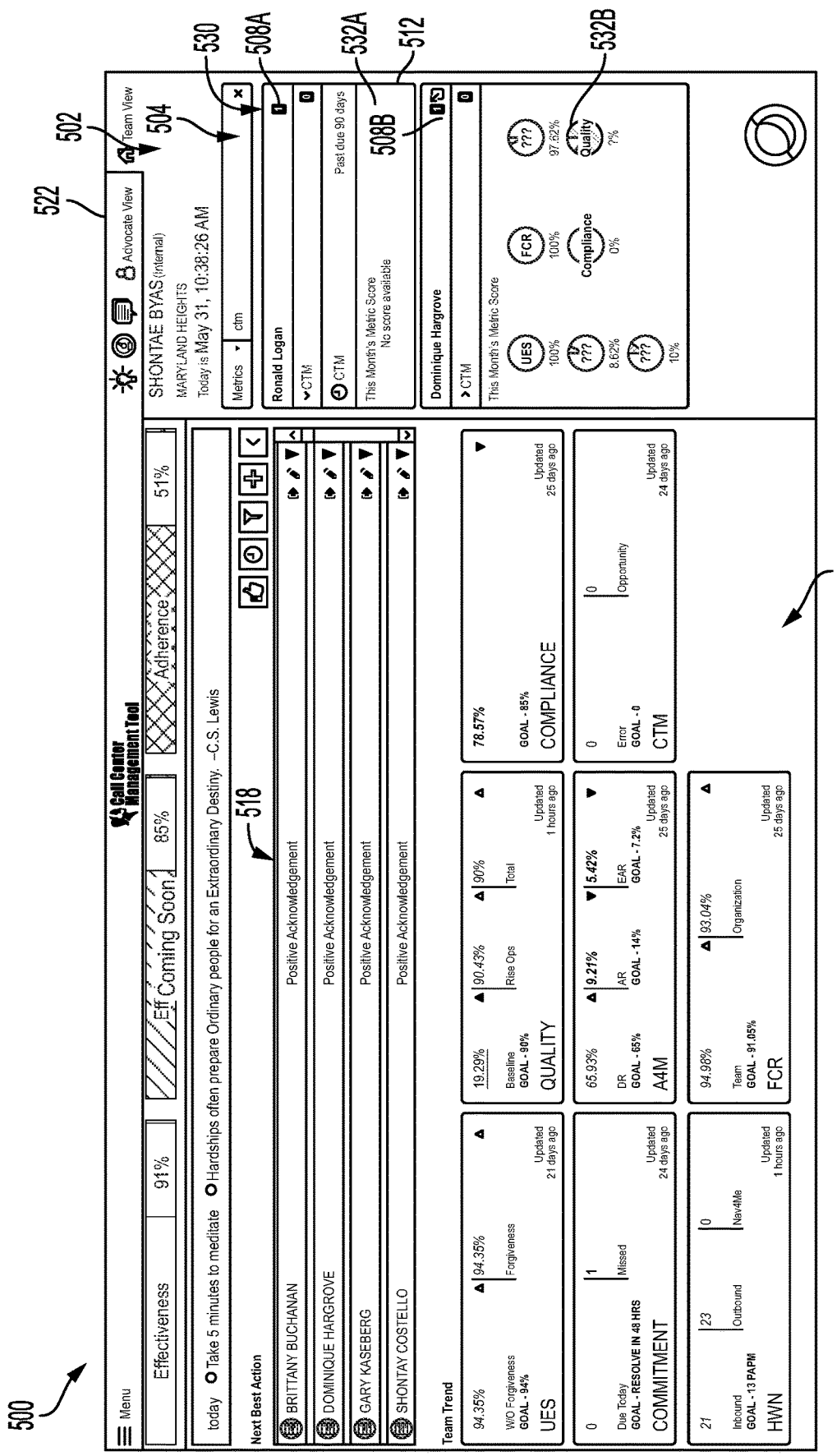

In various embodiments, the team tab 500 may include a team member search element 504. In various embodiments, the team member search element 504 comprises a search field into which the team leader (e.g., via a user input device in communication with the processor 308 of the team leader user computing entity 30A) may provide a search query for filtering the list of team members 506 based on team member name or based on one or more metrics (e.g., as shown in FIG. 6). For example, the team member search element 504 may comprise a query type selector 526 and through interaction with the query type selector 526 the team leader may indicate whether the query is a team member name query or a metric query. The team leader may then type and/or otherwise enter the query into the search field and the list of team members 506 may be updated (e.g., in real time and/or near real time) based on filtering the team members using the query entered into the search field. In various embodiments, the filtered team member list 530 (e.g. the team member list 506 after filtering via a metric query, for example), the filtered team member tiles 508 may include a filtered team member summary 532, as shown in FIG. 6. For example, the filtered team member list 530 filtered based on a query metric may only include team member tiles 508 for team members having a corresponding metric value that is below the minimal acceptable level for the metric and/or that is high than the goal level for the metric. The filtered team member summary 532B provides a graphical summary of the performance of the corresponding team member for one or more metrics. In an example embodiment, when a team member has moved from a first team to a second team (e.g., as shown with the team member tile 508A having a team change indicator 512 border), the team leader of the first team is not able to view performance of the corresponding team member for one or more metrics and/or graphical representations thereof (e.g., the filtered team member summary 532A is empty and/or not populated). Additionally, the team member tile 508B corresponding to a team member that has been moved from a first team to a second team does not include an overlay selectable IUI element 510 such that the team leader of the first team cannot launch a team member tab corresponding to the team member that has been moved to the second team.

Figure 7A:
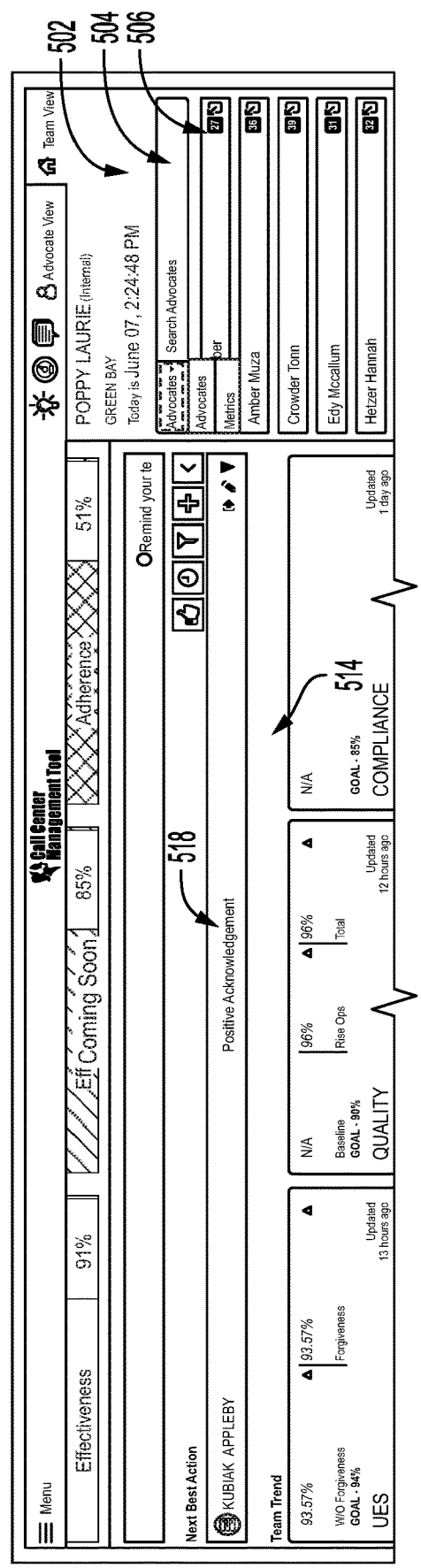
Figure 7B:
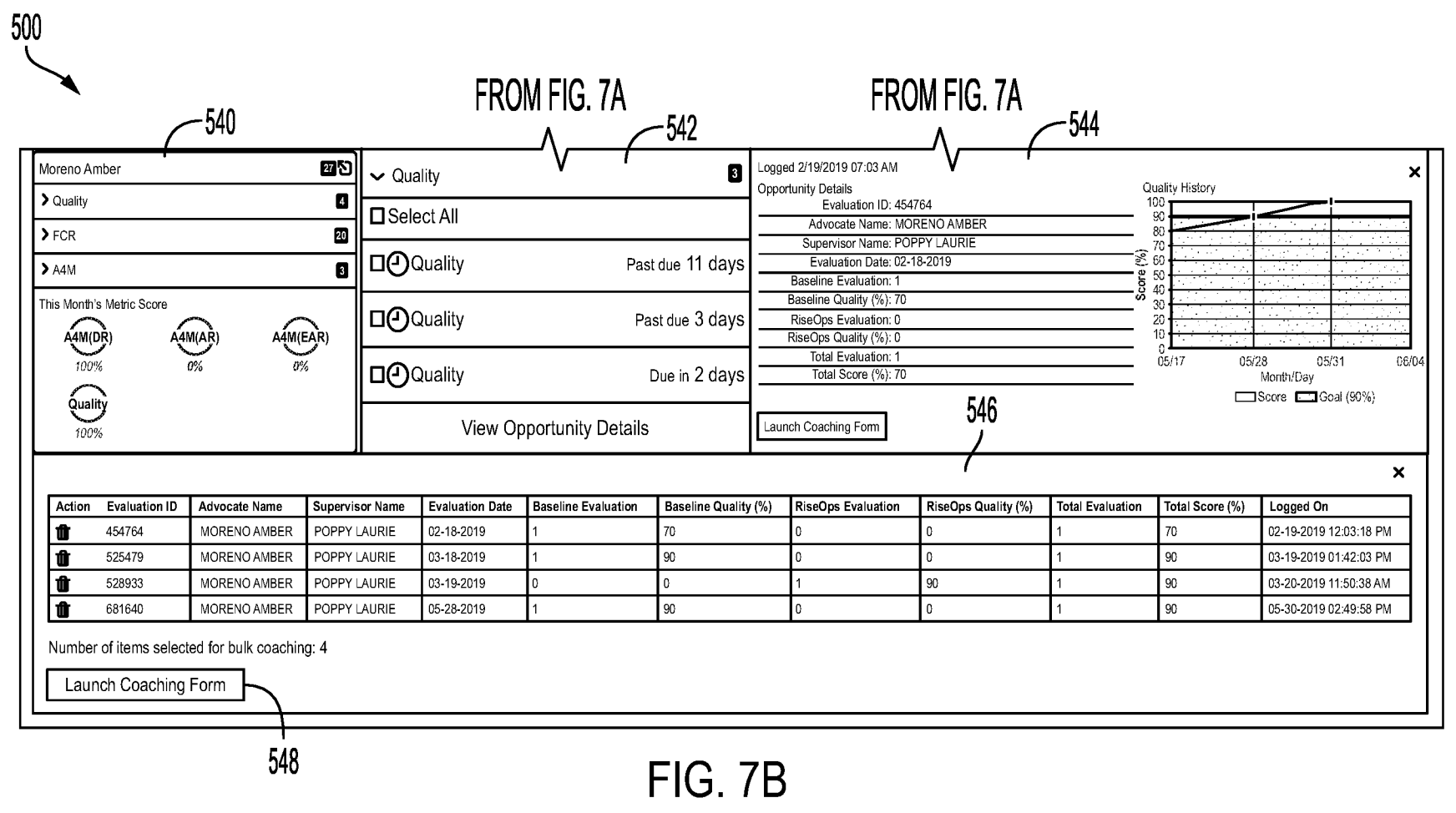
Figure 8:
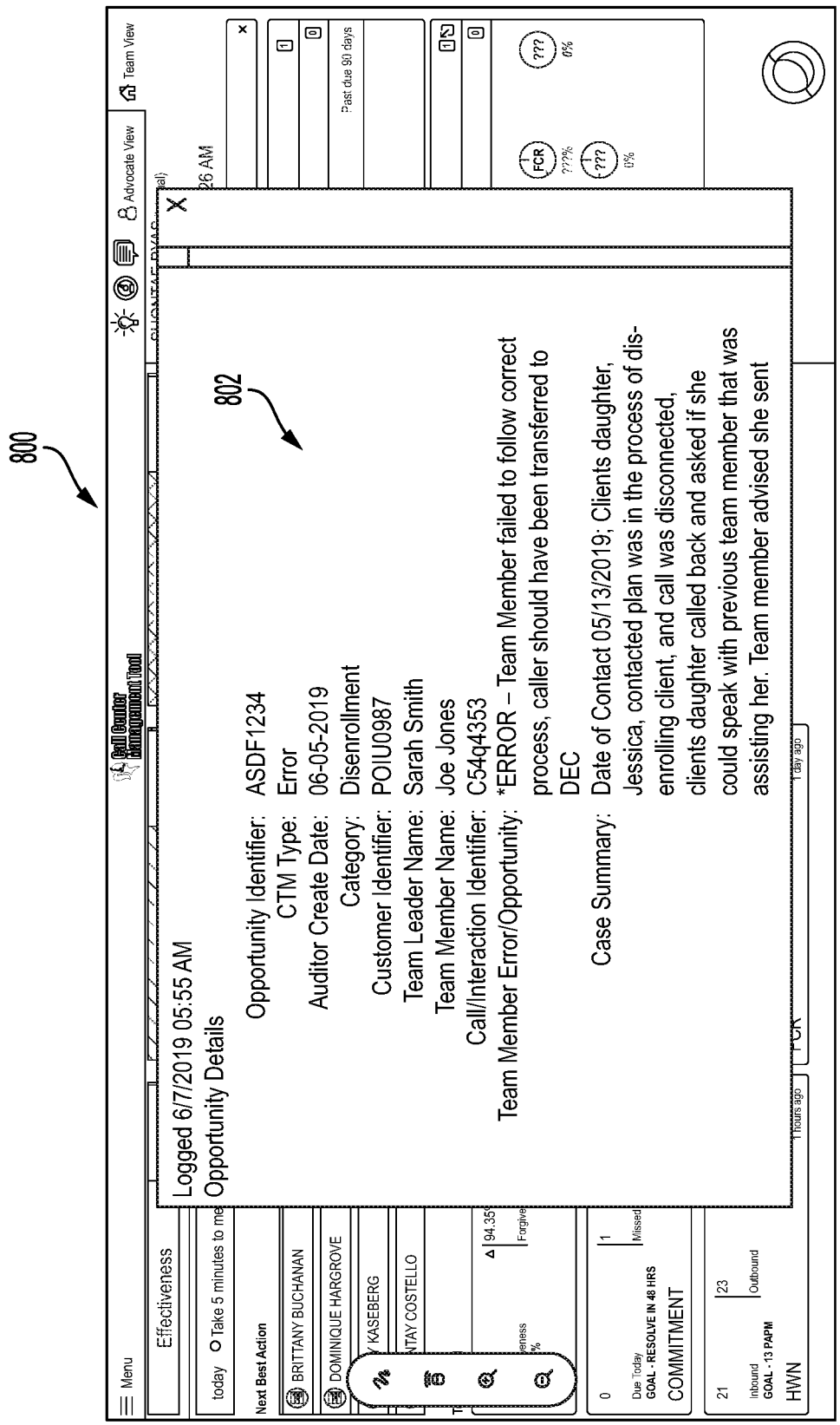

In an example embodiment, when a team leader selects (e.g., clicks and/or otherwise selects via a user input device in communication with processor 308 of the team leader user computing entity 30A) a team member tile 508, the team leader IUI provides a team member summary 540 within the team member list 506 section of the team leader IUI (or elsewhere on the team leader IUI, in an example embodiment). The team member summary 540 may provide a summary of the team member's performance via various metrics corresponding to the team member's performance and/or graphical representations thereof, as shown in FIGS. 7A and 7B.

In various embodiments, the team tab 500 of the team leader IUI comprises a metric section 514 populated with metric tiles 516. Each metric tile 516 corresponds to a metric corresponding to a KPI for the team. The layout of a metric tile 516 may be particularly designed based on the corresponding metric. In an example embodiment, a metric tile 516 may comprise a metric name and/or metric identifier, information/data regarding the current value of the metric for the team, a goal value of the metric for the team, a short term trend in the metric for the team (e.g., amount that the metric value has gone up or down since the previous update of the team leader IUI), a long term trend in the metric for the team (e.g., amount that the metric value has gone up or down since this time yesterday, this time last week, last month, and/or the like). In various embodiments, a metric tile 516 may show the metric value for the team and a corresponding metric value for the organization, a group of teams, and/or the like such that the team leader may compare the performance of their team to the organization or group of teams. In an example embodiment, a metric tile 516 may indicate when the metric tile 516 and/or the metric information/data displayed via the metric tile 516 was last updated. As noted above, a metric tile 516 may be a selectable IUI element. In an example embodiment, when a team leader selects (e.g., clicks on and/or otherwise selects via a user input device in communication with processing element 308 of the team leader user computing entity 30A) a metric tile 516, the team leader IUI may provide a metric summary 542 and/or a metric trend summary 544. In various embodiments, the metric summary 542 and/or metric trend summary 544 may comprise a selectable IUI element configured to provide access to information/data corresponding to open coaching opportunities corresponding to the metric corresponding to the metric summary 542 and/or metric trend summary 544 (e.g., provided via a coaching opportunity summary 546) and/or access to one or more coaching forms corresponding to open coaching opportunities corresponding to the metric corresponding to the metric summary 542 and/or metric trend summary 544 (e.g., provided via a coaching opportunity detail view 800).

In various embodiments, the team tab 500 of the team leader IUI comprises an action list section 518 populated with action tiles 528. In an example embodiment, the action tiles 528 are ordered based on corresponding priorities (e.g., as determined by the recommendation model). For example, the action list section 518 may include one or more action tiles 528 that are ordered such that action items corresponding to coaching opportunities that are more important for the team leader to complete in order for the team to achieve its goals are listed higher and/or more prominently than action items corresponding to coaching opportunities that are less important for the team leader to complete in order for the team to achieve its goals. In various embodiments, an action tile 528 is a selectable IUI element such that when a team leader selects (e.g., clicks on and/or otherwise selects via a user input device in communication with processing element 308 of the team leader user computing entity 30A) an action tile 528, the team leader IUI may provide a coaching opportunity summary 546 and/or a coaching opportunity detail view 800 displaying coaching opportunity information/data. In an example embodiment, the selection of the action tile 528 causes the team leader IUI to provide the coaching opportunity summary 546 including a launch coaching form selectable IUI element 548. Selection of the launch coaching form selectable IUI element 548 may cause the team leader IUI to provide the coaching opportunity detail view 800 providing the pre-filled coaching form 802 (e.g., a coaching form with one or more administrative and/or substantive fields populated by the recommendation model).

In certain embodiments, selecting the action list section 518 of the team leader IUI may cause the team leader IUI to display an expanded view of the action list section, such as that shown in FIG. 12. As shown therein, a plurality of actions may be displayed (e.g., in an order of determined priority). Moreover, the expanded view of the action list section comprises and/or enables access to a user interface section configured to enable a user to manually generate a new action, for example, for a manually identified coaching opportunity. Within the action generation section of the IUI, a user may select a particular individual (team member) to which the action relates (e.g., from a drop down list of team members), a title of the action (e.g., from a drop down list of action titles), and/or other characteristics of the action.

In various embodiments, the team tab 500 of the team leader IUI comprises a team performance overview section 520. In various embodiments, the team performance overview section 520 is configured to provide the team leader with a graphical overview of the current (e.g., (near) real time) team performance with respect to one or more metrics. In an example embodiment, the team performance overview section 520 may provide a graphical representation of the team goal achievement information/data. In an example embodiment, the team performance overview section 520 may indicate one or more metrics that the team is performing well at (e.g., operating at or above the goal level for the corresponding metric).

In various embodiments, the team tab 500 of the team leader IUI may comprise a ticker section 524. In an example embodiment, the ticker section 524 may be used to provide management tips, self-care tips, organizational reminders, and/or the like to the team leader. In various embodiments, as noted above, a team leader may access a team member tab 900 by selecting an overlay selectable IUI element 510 overlaid on the corresponding team members team member tile 508. A team leader may also access a team member tab 900 by selecting a selectable tab element 522 of the team tab 500 of the team leader IUI.

Figure 9:
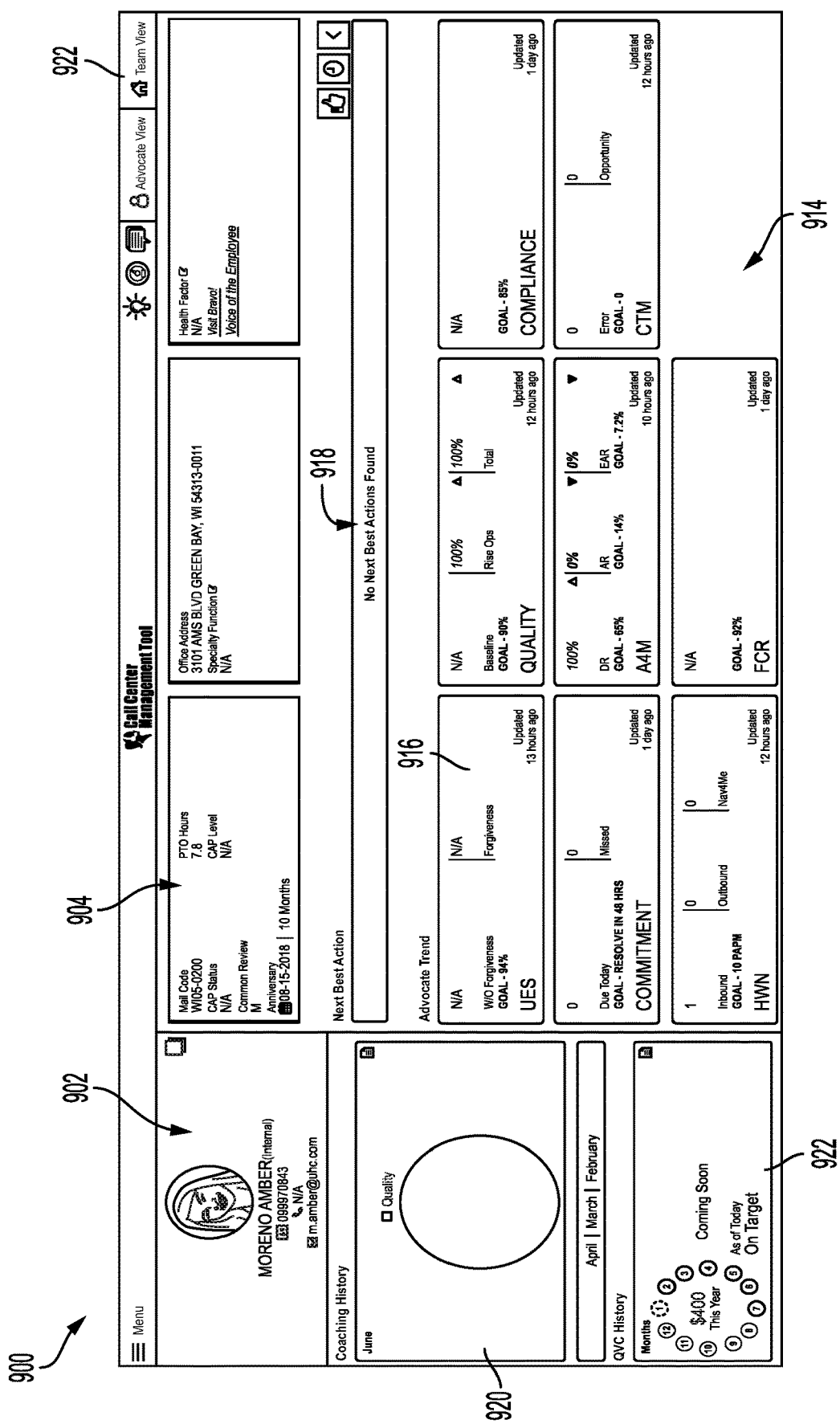

FIG. 9 illustrates an example team member tab 900 of a team leader IUI, according to an example embodiment. In various embodiments, the team member tab 900 comprises team member identifying section 902, team member information/data section 904, team member metric section 914, team member action items section 918, coaching history section 920, and goal achievement section 922. In various embodiments, the team member identifying section 902 comprises information/data identifying the team member (e.g., team member name and/or other team member identifier, team member picture or avatar, team member contact information/data, team member desk/office location, and/or the like). In various embodiments, the team member information/data section 904 may provide information/data corresponding to the team member's employment history, training history, special skills, birthday, amount of personal time off taken and/or remaining, address, mail code, and/or the like.

In various embodiments, the team member tab 900 of the team leader IUI comprises a member metric section 914 populated with member metric tiles 916. Each member metric tile 916 corresponds to a metric corresponding to a KPI for the team member. The layout of a member metric tile 916 may be particularly designed based on the corresponding metric. In an example embodiment, a member metric tile 916 may comprise a metric name and/or metric identifier, information/data regarding the current value of the metric for the team member, a goal value of the metric for the team member, a short term trend in the metric for the team member (e.g., amount that the metric value has gone up or down since the previous update of the team leader IUI), a long term trend in the metric for the team member (e.g., amount that the metric value has gone up or down since this time yesterday, this time last week, last month, and/or the like). In various embodiments, a member metric tile 916 may show the metric value for the team member and a corresponding metric value for the team such that the team leader may compare the performance of the team member to the performance of the team as a whole. In an example embodiment, a member metric tile 916 may indicate when the member metric tile 916 and/or the metric information/data displayed via the member metric tile 916 was last updated. As noted above, a member metric tile 916 may be a selectable IUI element. In an example embodiment, when a team leader selects (e.g., clicks on and/or otherwise selects via a user input device in communication with processing element 308 of the team leader user computing entity 30A) a member metric tile 916, the team leader IUI may provide a member metric summary (e.g., similar to the metric summary 542) and/or a member metric trend summary (e.g., similar to the metric trend summary 544) corresponding to the performance of the team member. In various embodiments, the member metric summary and/or member metric trend summary may comprise a selectable IUI element configured to provide access to information/data corresponding to open coaching opportunities corresponding to the team member and the metric corresponding to the member metric summary and/or member metric trend summary (e.g., provided via a coaching opportunity summary 546) and/or access to one or more coaching forms corresponding to open coaching opportunities corresponding to the team member and the metric corresponding to the member metric summary and/or member metric trend summary (e.g., provided via a coaching opportunity detail view 800).

In various embodiments, the team member tab 900 of the team leader IUI comprises a member action list section 918 populated with action tiles (not shown). In an example embodiment, the action tiles are ordered based on corresponding priorities (e.g., as determined by the recommendation model). For example, the member action list section 918 may include one or more action tiles that are ordered such that action items corresponding to coaching opportunities for the team member that are more important for the team leader to complete in order for the team to achieve its goals (and/or for the team member to achieve their goals) are listed higher and/or more prominently than action items corresponding to coaching opportunities for the team member that are less important for the team leader to complete in order for the team to achieve its goals (and/or for the team member to achieve their goals). In various embodiments, an action tile is a selectable IUI element such that when a team leader selects (e.g., clicks on and/or otherwise selects via a user input device in communication with processing element 308 of the team leader user computing entity 30A) an action tile, the team leader IUI may provide a coaching opportunity summary 546 and/or a coaching opportunity detail view 800 displaying coaching opportunity information/data. In an example embodiment, the selection of the action tile causes the team leader IUI to provide the coaching opportunity summary 546 including a launch coaching form selectable IUI element 548. Selection of the launch coaching form selectable IUI element 548 may cause the team leader IUI to provide the coaching opportunity detail view 800 providing the pre-filled coaching form 802 (e.g., a coaching form with one or more administrative and/or substantive fields populated by the recommendation model).

In various embodiments, the team member tab 900 of the team leader IUI comprises a coaching history section 920. In various embodiments, the coaching history section 920 may indicate topics on which the team member has been coached in a time period, a number of times the team member has been coached in a time period, and/or the like. For example, the coaching history section 920 may provide coaching history information/data (e.g., topics team member has been coached on, number of times team member has been coached, and/or the like) broken down into time periods of a week, a month, a quarter, and/or the like.

In various embodiments, the team member tab 900 of the team leader IUI comprises a goal achievement section 922. The goal achievement section 922 may provide a graphical representation of goals the team member has achieved, goals the team member has achieved, goals the team member is on target to achieve, personal goal achievement information/data indicating the most important metrics for the team member to improve and/or to maintain to achieve one or more goals, and/or the like. In an example embodiment, the goal achievement section 922 and/or the coaching history section 920 may provide coaching prevention information/data corresponding to the team member.

In various embodiments, a team leader may return to the team tab 500 by selecting a selectable tab element 922 of the team member tab 900 of the team leader IUI.

FIG. 10 provides a flowchart illustrating various operations, procedures, processes, and/or the like that may be performed by a team leader user computing entity 30A to provide a team leader IUI, in an example embodiment. Starting at step/operation 1002, a team leader logs on to a team leader user computing entity 30A and operates the team leader user computing entity 30A to access a portal (e.g., via a browser) or a dedicated application, in an example embodiment. In an example embodiment, a team leader access a team leader user computing entity 30A and logs into a portal (e.g., via a browser) or a dedicated application. For example, the team leader user computing entity 30A may receive log in information/data (e.g., username and password, biometric authentication, two factor authentication, and/or the like) and use the log in information/data to authenticate the team leader.

At step/operation 1004, the team members associated with the team leader are identified. For example, the team leader user computing entity 30A, the analysis computing entity 200, and/or another computing entity may identify the team members associated with the team leader. For example, team leader information/data may be stored, for example, in a team leader profile in memory 210, 215, 322, 324 (e.g., in a profile database and/or the like). The team leader information/data may include a team identifier configured to identify the team corresponding to (e.g., led by) the team leader. The memory 210, 215, 322, 324 may also store a plurality of team member profiles (e.g., in a profile database and/or the like) comprising team member information/data with each team member profile including and/or associated with a team identifier. The profile database may queried to identify each team member profile associated with and/or including the team identifier corresponding to the team leader.

At step/operation 1006, coaching opportunities associated with the team members of the team corresponding to the team leader are identified. For example, the team leader user computing entity 30A, the analysis computing entity 200, and/or another computing entity may identify the coaching opportunities corresponding to team members associated with the team leader. For example, a team member profile may include coaching opportunity information/data relating to open and/or completed coaching opportunities that are associated with the team member corresponding to the team member profile. Coaching opportunity information/data may be accessed from the team member profiles corresponding to the team members associated with the team lead by the team leader. In an example embodiment, one or more other action items (e.g., administrative action items and/or the like) corresponding to the team and/or to be completed by the team leader are also identified.

At step/operation 1008, the coaching opportunities are ordered based on priorities. For example, the team leader user computing entity 30A, the analysis computing entity 200, and/or another computing entity may order the coaching opportunities accessed from the team member profiles based on priorities. For example, the coaching opportunity information/data may include a priority corresponding to the coaching opportunity. The identified coaching opportunities may then be ordered based on the corresponding priorities such that action items corresponding to coaching opportunities that are more important for the team leader to complete in order for the team to achieve its goals are listed higher and/or more prominently than action items corresponding to coaching opportunities that are less important for the team leader to complete in order for the team to achieve its goals. Any other action items identified at step/operation 1006 may also be ordered based on the corresponding priorities. In various embodiments, the recommendations for each action item and/or coaching opportunity are also accessed such that the recommendations may be provided to the team leader via the team leader IUI.

At step/operation 1010, metrics for the team and/or one or more team members may be accessed (e.g., from team member profiles) and/or may be determined based on performance information/data (e.g., captured and/or stored by data collection computing entities 100). For example, the team leader user computing entity 30A, the analysis computing entity 200, and/or another computing entity may access and/or determine metrics for team and/or one or more team members.

At step/operation 1012, the team leader IUI is provided. For example, graphical representations of one or more team and/or team member metrics, a priority ordered action item list, a priority ordered team member list, and/or the like may be generated, rendered, and provided as part of the team leader IUI. For example, the team leader IUI may be provided via a user interface of the team leader user computing entity 30A via the portal and/or dedicated application accessed by the team leader. In an example embodiment, the team tab 500 of the team leader IUI may be provided.

At step/operation 1014, user input is received selecting a tile (e.g., team member tile 508, metric tile 516, action tile 528, and/or the like). For example, the team leader user computing entity 30A may receive user input selecting a tile. For example, the team leader may provide input via a user input device in communication with processing element 308 of the team leader user computing entity 30A selecting a tile. The team leader user computing entity 30A may then access the further information/data corresponding to the selected tile. For example, the team leader user computing entity 30A may provide (e.g., transmit) a request for the further information/data corresponding to the selected tile (e.g., such that the analysis computing entity 200 and/or another computing entity receives the request). The team leader user computing entity 30A may then receive the further information/data corresponding to the selected tile that was provided by the analysis computing entity 200 and/or another computing entity in response to the request. The team leader user computing entity 30A may then provide the further information/data corresponding to the selected tile (e.g., team member summary 540, metric summary 542 and/or metric trend summary 544, coaching opportunity summary 546, coaching opportunity detail view 800, and/or the like) via the team leader IUI.

At step/operation 1016, user input is received selecting a selectable IUI element corresponding to a request for a coaching form (e.g., launch coaching form selectable IUI element 548). For example, the team leader user computing entity 30A may receive user input selecting a selectable IUI element corresponding to a request for a coaching form corresponding to a coaching opportunity. For example, the team leader may provide input via a user input device in communication with processing element 308 of the team leader user computing entity 30A selecting a selectable IUI element corresponding to a request for a coaching form. The team leader user computing entity 30A may then access the coaching form corresponding to the selected coaching opportunity. For example, the team leader user computing entity 30A may provide (e.g., transmit) a request for the coaching form corresponding to the selected coaching opportunity (e.g., such that the analysis computing entity 200 and/or another computing entity receives the request). The team leader user computing entity 30A may then receive the pre-filled coaching form corresponding to the selected coaching opportunity that was provided by the analysis computing entity 200 and/or another computing entity in response to the request. In various embodiments, the pre-filled coaching form comprises one or more fields that were populated by the recommendation model. For example, the recommendation model may populate one or more administrative fields of the coaching form and one or more substantive fields of the coaching form based on the coaching opportunity information/data and the recommendation model determined most efficient and/or effective manner of addressing the coaching opportunity (e.g., a most efficient and/or most effective coaching activity). At step/operation 1018, the coaching form is provided via the team leader IUI. For example, the team leader IUI (e.g., provided via the user interface of the team leader user computing entity 30A) may provide the coaching opportunity detail view 800 providing the pre-filled coaching form 802.

In various embodiments, the team leader IUI may be configured to receive user input (e.g., via team leader interaction with one or more user input devices that are in communication with the processing element 308 of the team leader user computing entity 30A) corresponding to a communication session addressing a coaching opportunity. For example, the team leader may use a pre-filled coaching form to conduct a coaching session with one or more team members to address a coaching opportunity. The team leader may then provide input via the team leader IUI indicating that the coaching opportunity has been addressed. One or more member profiles may then be updated to indicate that the coaching opportunity has been addressed. The action tile 528 may then be removed from the action list 518. In an example embodiment, the team member tiles 508 displayed in the team member list 506 may also be adjusted (e.g., the number of open coaching opportunities corresponding to one or more team members may be adjusted and/or the order of team member tiles 508 may be modified). In an example embodiment, one or more outcome indicators corresponding to the completed coaching opportunity may be determined and the coaching form and the one or more outcome indicators may be used to refine the recommendation model.

At step/operation 1020, the team leader IUI may be updated. For example, the team leader IUI may be updated on a periodic basis (e.g., every hour, every other hour, every four hours, every day, and/or the like) such that the metrics and priorities (e.g., of the action items and/or the like) correspond to a current state for the team. For example, the analysis computing entity 200 may analyze performance information/data (e.g., captured and/or stored by one or more data collection computing entities 100) on a periodic basis and provide the updated metrics, action items, action item priorities, and/or the like to the team leader computing entity 30A such that the team leader computing entity 30A provides the most current and/or up to date metrics, action items, and/or the like. The team leader user computing entity 30A may provide various other functions of the team leader IUI as the team leader interacts with the team leader IUI (e.g., via providing input via one or more user input devices in communication with processing element 308 of the team leader user computing entity 30A). For example, a team leader may interact with the team leader IUI to add an action to the action list 518.

c. Exemplary Operation of a Team Member User Computing Entity

In various embodiments, a team member IUI is provided. For example, a team member may access a team member user computing entity 30B and access a team member IUI via a user interface thereof. In various embodiments, the team member IUI is similar to the team member tab 900 of the team leader IUI. For example, in an example embodiment, the team member IUI may include a team member identifying section, team member metric section, team member action items section, coaching history section, and goal achievement section. In various embodiments, the team member identifying section comprises information/data identifying the team member (e.g., team member name and/or other team member identifier, team member picture or avatar, team member contact information/data, team member desk/office location, and/or the like).

In various embodiments, the team member IUI comprises a member metric section populated with member metric tiles. Each member metric tile corresponds to a metric corresponding to a KPI for the team member. The layout of a member metric tile may be particularly designed based on the corresponding metric. In an example embodiment, a member metric tile may comprise a metric name and/or metric identifier, information/data regarding the current value of the metric for the team member, a goal value of the metric for the team member, a short term trend in the metric for the team member (e.g., amount that the metric value has gone up or down since the previous update of the team member IUI), a long term trend in the metric for the team member (e.g., amount that the metric value has gone up or down since this time yesterday, this time last week, last month, and/or the like). In various embodiments, a member metric tile may show the metric value for the team member and a corresponding metric value for the team such that the team member may compare the performance of the team member to the performance of the team as a whole. In an example embodiment, a member metric tile may indicate when the member metric tile and/or the metric information/data displayed via the member metric tile was last updated. As noted above, a member metric tile may be a selectable IUI element. In an example embodiment, when a team member selects (e.g., clicks on and/or otherwise selects via a user input device in communication with processing element 308 of the team member user computing entity 30B) a member metric tile, the team member IUI may provide a member metric summary (e.g., similar to the metric summary 542) and/or a member metric trend summary (e.g., similar to the metric trend summary 544) corresponding to the performance of the team member. In various embodiments, the member metric summary and/or member metric trend summary may comprise a selectable IUI element configured to provide access to information/data corresponding to open coaching opportunities corresponding to the team member and the metric corresponding to the member metric summary and/or member metric trend summary (e.g., provided via a coaching opportunity summary 546) and/or access to one or more coaching forms corresponding to open and/or closed coaching opportunities corresponding to the team member and the metric corresponding to the member metric summary and/or member metric trend summary (e.g., provided via a coaching opportunity detail view 800).

In various embodiments, the team member IUI comprises a member action list section populated with action tiles. In an example embodiment, the action tiles are ordered based on corresponding priorities (e.g., as determined by the recommendation model). For example, the member action list section may include one or more action tiles that are ordered such that action items corresponding to coaching opportunities for the team member that are more important for the team member to complete in order for the team to achieve its goals (and/or for the team member to achieve their goals) are listed higher and/or more prominently than action items corresponding to coaching opportunities for the team member that are less important for the team member to complete in order for the team to achieve its goals (and/or for the team member to achieve their goals). In various embodiments, an action tile is a selectable IUI element such that when a team member selects (e.g., clicks on and/or otherwise selects via a user input device in communication with processing element 308 of the team member user computing entity 30B) an action tile, the team member IUI may provide a coaching opportunity summary and/or a coaching opportunity detail view displaying coaching opportunity information/data. In an example embodiment, the selection of the action tile causes the team member IUI to provide the coaching opportunity summary including a launch coaching form selectable IUI element. Selection of the launch coaching form selectable IUI element may cause the team member IUI to provide the coaching opportunity detail view providing the pre-filled coaching form (e.g., a coaching form with one or more administrative and/or substantive fields populated by the recommendation model).

In various embodiments, the team member IUI comprises a coaching history section. In various embodiments, the coaching history section may indicate topics on which the team member has been coached in a time period, a number of times the team member has been coached in a time period, and/or the like. For example, the coaching history section may provide coaching history information/data (e.g., topics team member has been coached on, number of times team member has been coached, and/or the like) broken down into time periods of a week, a month, a quarter, and/or the like.

In various embodiments, the team member IUI comprises a goal achievement section. The goal achievement section may provide a graphical representation of goals the team member has achieved, goals the team member has achieved, goals the team member is on target to achieve, personal goal achievement information/data indicating the most important metrics for the team member to improve and/or to maintain to achieve one or more goals, and/or the like. In an example embodiment, the goal achievement section and/or the coaching history section may provide coaching prevention information/data corresponding to the team member. In an example embodiment, the goal achievement section may also include information/data describing one or more goals for the team and/or team member.

In various embodiments, the team member IUI may also include a team leader information/data section. In an example embodiment, the team leader information/data section may indicate the name of the team leader, contact information/data for the team leader, a desk/office location of the team leader, and/or the like.

FIG. 11 provides a flowchart illustrating various operations, procedures, processes, and/or the like that may be performed by a team member user computing entity 30B to provide a team member IUI, in an example embodiment. Starting at step/operation 1102, a team member logs on to a team member user computing entity 30B and operates the team member user computing entity 30B to access a portal (e.g., via a browser) or a dedicated application, in an example embodiment. In an example embodiment, a team member accesses a team member user computing entity 30B and logs into a portal (e.g., via a browser) or a dedicated application. For example, the team member user computing entity 30B may receive log in information/data (e.g., username and password, biometric authentication, two factor authentication, and/or the like) and use the log in information/data to authenticate the team leader.

At step/operation 1104, actions associated with the team member are identified. For example, the team member user computing entity 30B, the analysis computing entity 200, and/or another computing entity may identify the actions corresponding to team members. For example, a team member profile may include actions (e.g., coaching opportunity information/data corresponding to open and/or completed coaching opportunities and/or actions to be completed by the team member) corresponding to the team member corresponding to the team member profile. Actions may be accessed from the team member profile.

At step/operation 1106, the actions corresponding to the team member are ordered based on priorities. For example, the team member user computing entity 30B, the analysis computing entity 200, and/or another computing entity may order the actions accessed from the team member profile based on priorities. For example, the actions may be associated with a priority corresponding to the action and determined by the recommendation model. The identified actions may then be ordered based on the corresponding priorities such that actions that are more important for the team member to complete in order for the team to achieve its goals (and/or for the team member to achieve their goals) are listed higher and/or more prominently than actions that are less important for the team member to complete in order for the team to achieve its goals (and/or for the team member to achieve their goals). In various embodiments, recommendations may be provided for one or more actions. In an example embodiment, the recommendations are determined by the recommendation model.

At step/operation 1108, coaching prevention information/data associated with the team member are identified. For example, the team member user computing entity 30B, the analysis computing entity 200, and/or another computing entity may identify the coaching prevention information/data corresponding to the team member. For example, a team member profile may include coaching prevention information/data associated with the team member corresponding to the team member profile. The coaching prevention information/data may be accessed from the team member profile.

At step/operation 1110, personal goal achievement information/data associated with the team member are identified. For example, the team member user computing entity 30B, the analysis computing entity 200, and/or another computing entity may identify the personal goal achievement information/data corresponding to the team member. For example, a team member profile may include personal goal achievement information/data corresponding to the team member corresponding to the team member profile. The personal goal achievement information/data may be accessed from the team member profile.

At step/operation 1112, the team member IUI is provided. For example, graphical representations of one or more team and/or team member metrics, a priority ordered action item list, coaching prevention information/data, personal goal achievement information/data, and/or the like may be generated, rendered, and provided as part of the team member IUI. For example, the team member IUI may be provided via a user interface of the team member user computing entity 30B via the portal and/or dedicated application accessed by the team leader.

At step/operation 1114, the team member IUI may be updated. For example, the team member IUI may be updated on a periodic basis (e.g., every hour, every other hour, every four hours, every day, and/or the like) such that the metrics and priorities (e.g., of the action items and/or the like) correspond to a current state for the team and/or team member. For example, the analysis computing entity 200 may analyze performance information/data (e.g., captured and/or stored by one or more data collection computing entities 100) on a periodic basis and provide the updated metrics, action items, action item priorities, and/or the like to the team member computing entity 30B such that the team member computing entity 30B provides the most current and/or up to date metrics, action items, and/or the like. The team member user computing entity 30B may provide various other functions of the team member IUI as the team member interacts with the team member IUI (e.g., via providing input via one or more user input devices in communication with processing element 308 of the team member user computing entity 30B).

d. Technical Advantages

Various embodiments provide a variety of technical improvements over traditional team management. For example, various embodiments provide a technical solution to the technical problem of providing up to date team metrics corresponding to KPIs for a team in a manner that allows a team leader to quickly gauge the performance of their team and determine the actions that will most efficiently and most effectively improve the performance of the team. For example, in various embodiments, a recommendation model is trained to identify coaching opportunities, determine the most effective manner for addressing the coaching opportunity (e.g., forgiving the coaching opportunity; providing training, tips, training materials and/or the like to one or more team members; and/or providing positive feedback) in terms of improving and/or maintaining the team performance. The recommendation of addressing the coaching opportunity is determined based on an objective analysis of a plurality of team and team member metrics which provides for a more nuanced view of the team and/or team member performance. Thus, the team leader IUI (and the team member IUI) provide an improved interactive user interface that provides an improved user experience and allows the team leader to be more efficient in managing their team. Additionally, in various embodiments, the recommendation model is configured to populate one or more substantive fields of a coaching form corresponding to a coaching opportunity. For example, the recommendation model may be trained to determine the most efficient manner for addressing a particular situation (e.g., appropriate tips, training materials, and/or the like) to make a coaching session effective and efficient. Moreover, the recommendation model is trained using coaching opportunity information/data (e.g., coaching forms corresponding to completed coaching opportunities and the corresponding outcome indicators) for multiple teams having overlapping KPIs and/or overlapping goals. Thus, the recommendation model benefits from learning (e.g., via one or more machine learning algorithms) from the habits of a plurality of team leaders. Thus, the recommendations and pre-filled coaching forms generated by the recommendation model benefit from the strengths of the plurality of team leaders, making each independent team leader more effective in leading their own team.

Various embodiments provide additional technical advantages for individual team members as well, as various embodiments provide a recommendation model for individuals to provide those individuals with data indicative of current trends in their performance via IUIs generated specifically for those individuals, and for providing alerts (e.g., via the same IUIs) if the individual's performance is likely to fall below goal and/or minimum threshold levels based on data retrieved from one or more data sources. Thus, by providing this information in real time and/or near real time for individuals via one or more IUIs those individuals may ensure that they have a complete understanding of their current performance so as to make appropriate adjustments, if necessary, to their activities.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing one or more action recommendations via an interactive user interface (IUI), the method comprising:
   causing, by a user computing entity, display of the IUI via a user interface of the user computing entity, wherein:
      the IUI comprises an action list comprising one or more action items, each action item of the one or more action items corresponding to one or more team members of a team,
      the one or more action items are automatically ordered for display based at least in part on one or more action priorities,
      at least one of the one or more action items corresponds to a coaching opportunity and a recommendation for responding to the coaching opportunity,
      the coaching opportunity is automatically identified using a recommendation model trained using machine learning based at least in part on performance data corresponding to a plurality of key performance indicator metrics,
      the recommendation for responding to the coaching opportunity is determined (a) using the recommendation model trained using machine learning and (b) based at least in part on the performance data corresponding to the plurality of key performance indicator metrics, and
      the recommendation model is trained using data regarding previous handlings of coaching opportunities and corresponding outcome indicators for a cluster of teams;
   receiving, by the user computing entity, user input via the IUI selecting an IUI element requesting a coaching form corresponding to a first coaching opportunity corresponding to a first team member;
   receiving, by the user computing entity, the coaching form; and
   causing, by the user computing entity, display of the coaching form via the IUI via the user interface, wherein (a) the coaching form is pre-filled with output from the recommendation model, (b) performance data corresponding to the plurality of key performance indicator metrics for a time period after the first team member was coached in accordance with the coaching form is used to determine one or more outcome indicators corresponding to the coaching opportunity, and (c) the coaching form and one or more outcome indicators are used to further train the recommendation model.

2. The method of claim 1, wherein the recommendation for responding to the coaching opportunity is one of (a) provide positive feedback, (b) address the coaching opportunity, or (c) forgive the coaching opportunity.

3. The method of claim 1, wherein, to train the recommendation model, a set of teams are analyzed to identify teams that have at least one of (a) overlapping sets of key performance indicator metrics used to track performance for each team and/or team member or (b) overlapping priorities to generate the cluster of teams.

4. The method of claim 1, wherein the action list is automatically updated on a periodic basis.

5. The method of claim 1, wherein the IUI further comprises one or more metrics each corresponding to one of the plurality of key performance indicators, the one or more metrics determined by analyzing performance data corresponding to one or more team members.

6. The method of claim 5, wherein the performance data is analyzed in real time with respect to the generation of the performance data.

7. The method of claim 5, wherein the IUI further comprises data regarding how to meet one or more team goals or team member goals based at least in part on the one or more metrics.

8. The method of claim 1, wherein the IUI comprises a first tab corresponding to a selected team member and a team tab corresponding to performance of the team.

9. The method of claim 1, wherein the team leader IUI comprises a list of team members of the team, the list of team members being ordered based at least in part on an urgency of one or more coaching opportunities associated with one or more team members.

10. An apparatus comprising at least one processor, at least one communications interface, a user interface, and at least one memory including computer program code, the at least one memory and computer program code configured to, with the processor, cause the apparatus to at least:
cause display of an interactive user interface (IUI) via the user interface of the apparatus, wherein:
the IUI comprises an action list comprising one or more action items, each action item of the one or more action items corresponding to one or more team members of a team,
the one or more action items are automatically ordered for display based at least in part on one or more action priorities,
at least one of the one or more action items corresponds to a coaching opportunity and a recommendation for responding to the coaching opportunity,
the coaching opportunity is automatically identified using a recommendation model trained using machine learning based at least in part on performance data corresponding to a plurality of key performance indicator metrics,
the recommendation for responding to the coaching opportunity is determined (a) using the recommendation model trained using machine learning and (b) based at least in part on the performance data corresponding to the plurality of key performance indicator metrics, and
the recommendation model is trained using data regarding previous handlings of coaching opportunities and corresponding outcome indicators for a cluster of teams;
receive user input via the IUI selecting an IUI element requesting a coaching form corresponding to a first coaching opportunity corresponding to a first team member;
receive the coaching form; and
cause display of the coaching form via the IUI via the user interface, wherein (a) the coaching form is pre-filled with output from the recommendation model, (b) performance data corresponding to the plurality of key performance indicator metrics for a time period after the first team member was coached in accordance with the coaching form is used to determine one or more outcome indicators corresponding to the coaching opportunity, and (c) the coaching form and one or more outcome indicators are used to further train the recommendation model.

11. The apparatus of claim 10, wherein the recommendation for responding to the coaching opportunity is one of (a) provide positive feedback, (b) address the coaching opportunity, or (c) forgive the coaching opportunity.

12. The apparatus of claim 10, wherein to train the model, a set of teams are analyzed to identify teams that have at least one of (a) overlapping sets of key performance indicator metrics used to track performance for each team and/or team member and (b) overlapping priorities to generate the cluster of teams.

13. The apparatus of claim 10, wherein the IUI further comprises one or more metrics each corresponding to one of the plurality of key performance indicator metrics, the one or more metrics determined by analyzing performance data corresponding to one or more team members.

14. The apparatus of claim 13, wherein the IUI further comprises data regarding how to meet one or more team goals or team member goals based at least in part on the one or more metrics.

15. The apparatus of claim 10, wherein the IUI comprises a list of team members of the team, the list of team members being ordered based at least in part on an urgency of one or more coaching opportunities associated with one or more team members.

16. A computer program product comprising at least one non-transitory computer-readable storage medium having computer-executable program code portions stored therein, the computer-executable program code portions, when executed by a processor of computing entity, are configured to cause the computing entity to at least:
cause display of an interactive user interface (IUI) via a user interface of the computing entity, wherein:
the IUI comprises an action list comprising one or more action items, each action item of the one or more action items corresponding to one or more team members of a team,
the one or more action items are automatically ordered for display based at least in part on one or more action priorities,
at least one of the one or more action items corresponds to a coaching opportunity and a recommendation for responding to the coaching opportunity,
the coaching opportunity is automatically identified using a recommendation model trained using machine learning based at least in part on performance data corresponding to a plurality of key performance indicator metrics,
the recommendation for responding to the coaching opportunity is determined (a) using the recommendation model trained using machine learning and (b) based at least in part on the performance data corresponding to the plurality of key performance indicator metrics, and
the recommendation model is trained using data regarding previous handlings of coaching opportunities and corresponding outcome indicators for a cluster of teams;
receive user input via the IUI selecting an IUI element requesting a coaching form corresponding to a first coaching opportunity corresponding to a first team member;
receive the coaching form; and
cause display of the coaching form via the IUI via the user interface, wherein (a) the coaching form is pre-filled with output from the recommendation model, (b) performance data corresponding to the plurality of key performance indicator metrics for a time period after the first team member was coached in accordance with the coaching form is used to determine one or more outcome indicators corresponding to the coaching opportunity, and (c) the coaching form and one or more outcome indicators are used to further train the recommendation model.

* * * * *